United States Patent
Bradley

(10) Patent No.: US 12,063,139 B1
(45) Date of Patent: Aug. 13, 2024

(54) CLOSED-LOOP QUADRATURE CONVERTER

(71) Applicant: Anritsu Company, Morgan Hill, CA (US)

(72) Inventor: Donald Anthony Bradley, Morgan Hill, CA (US)

(73) Assignee: Anritsu Company, Morgan Hill, CA (US)

( * ) Notice: Subject to any disclaimer, the term of this patent is extended or adjusted under 35 U.S.C. 154(b) by 2 days.

(21) Appl. No.: 17/977,232

(22) Filed: Oct. 31, 2022

Related U.S. Application Data

(60) Provisional application No. 63/274,324, filed on Nov. 1, 2021.

(51) Int. Cl.
*H04L 27/36* (2006.01)
(52) U.S. Cl.
CPC .................... *H04L 27/364* (2013.01)
(58) Field of Classification Search
CPC .................................................... H04L 27/364
See application file for complete search history.

(56) References Cited

U.S. PATENT DOCUMENTS

| | | | | |
|---|---|---|---|---|
| 2006/0083335 A1* | 4/2006 | Seendripu | ............... | H03D 3/008 375/332 |
| 2008/0130800 A1* | 6/2008 | Maxim | ..................... | H03C 3/40 375/345 |
| 2009/0143027 A1* | 6/2009 | Mirzaei | ................ | H03D 7/1441 455/90.2 |

OTHER PUBLICATIONS

F. Jonsson and H. Olsson, "A quadrature oscillator using simplified phase and amplitude calibration," 2008 IEEE International Symposium on Circuits and Systems (ISCAS), Seattle, WA, USA, 2008 (Year: 2008).*

(Continued)

*Primary Examiner* — Sam K Ahn
*Assistant Examiner* — Amneet Singh
(74) *Attorney, Agent, or Firm* — Kilpatrick Townsend & Stockton LLP

(57) ABSTRACT

Circuits, methods, and apparatus that can provide in-phase and quadrature LO signals having an accurate phase relationship and matching amplitudes. An example can provide a quadrature modulator having phase-correction circuitry and amplitude-correction circuitry. The quadrature modulator can include a quadrature hybrid to receive an LO signal from a phase-locked loop or other clock source. The quadrature hybrid can provide in-phase and quadrature LO signals to phase-correction circuitry, which can accurately align a difference in the phase of the in-phase and quadrature signals to 90 degrees. The amplitudes of the resulting signals can be adjusted to have a desired amplitude using amplitude-correction circuitry. The amplitude-and-phase-corrected LO signals can be used to modulate in-phase and quadrature components of a baseband signal. The modulated products can be combined, gained, and filtered as necessary for wireless transmission, device testing, or other purpose.

19 Claims, 11 Drawing Sheets

(56) References Cited

OTHER PUBLICATIONS

Smith, Benny R., "Choosing the Right Power Splitter: Two-resistor or Three-resistor," Inchworm Solutions, Santa Rosa, CA, National Conference of Standards Laboratories, pp. 1-9. Webpage <https://www.dinfo.unifi.it/upload/sub/laboratori/emc/Dispense MisureElettroniche/power splitter vs divider.pdf>, 9 pages, Oct. 5, 2022, retrieved from Internet Archive Wayback Machine <https://web.archive.org/web/20221005213631/https://www.dinfo.unifi.it/upload/sub/laboratori/emc/Dispense%20Misure%20Elettroniche/power%20splitter%20vs%20divider.pdf> on Mar. 10, 2023.

DoD Briefing Overview, Phase Matrix, Inc., San Jose, CA 95134 (USA), Microsoft Power Point Presentation Demo Slides 1-21 (2011).

\* cited by examiner

CLOSED-LOOP QUADRATURE CONVERTER

CROSS-REFERENCES TO RELATED APPLICATIONS

This application claims the benefit of U.S. provisional patent application No. 63/274,324, filed Nov. 1, 2021, which is incorporated by reference.

BACKGROUND

Wireless communication has become ubiquitous in daily life. Cell phones, computers, and home networks, as well as a growing array of smart and connected devices, such as speakers, lights, and home appliances, all communicate wirelessly.

Several improvements have been made to the circuits and techniques used in wireless communications. A primary improvement has been the advent of quadrature modulation and demodulation. Quadrature modulation and demodulation allow a more efficient use of a bandwidth of a channel, which can allow improved data rates, and can reduce a system's susceptibility to noise, which can lower a system's bit-error rate.

Quadrature modulation and demodulation effectively allow an amplitude and phase of a signal to be handled as separate components. In-phase and quadrature versions of a data signal can be individually modulated with in-phase and quadrature versions of a carrier signal, referred to as a local oscillator (LO) signal. The modulated signals can be added and the combination can be wirelessly transmitted. Upon receipt, the combined signal can be demodulated using an in-phase LO signal to recover the in-phase component of the data signal and demodulated using a quadrature LO signal to recover the quadrature component of the data signal.

In both quadrature modulation and quadrature demodulation, it can be important that the phase relationship between in-phase and quadrature LO signals be accurate. For example, a phase error between in-phase and quadrature versions of an LO signal can lead to intermodulation distortion, resulting in side-band components that can degrade performance.

Also, in both quadrature modulation and quadrature demodulation, it can be important that the amplitude of the in-phase and quadrature LO signals match. Differences in these amplitudes can lead to mismatches between output signals of mixers used for modulation or demodulation.

Thus, what is needed are circuits, methods, and apparatus that can provide in-phase and quadrature LO signals having an accurate phase relationship and matching amplitudes.

SUMMARY

Accordingly, embodiments of the present invention can provide circuits, methods, and apparatus that provide in-phase and quadrature LO signals having an accurate phase relationship and matching amplitudes.

An illustrative embodiment of the present invention can provide an IQ, or quadrature, modulator having circuitry for correcting a phase between quadrature LO signals and circuitry for correcting amplitudes of quadrature signals. The quadrature modulator can correct the phase and amplitude of the quadrature LO signals over a large frequency range. The quadrature modulator can include a quadrature hybrid to receive an LO signal from a phase-locked loop or other clock source. The quadrature hybrid can provide in-phase and quadrature components of the LO signal to phase-detection and correction circuitry, which can accurately align the phase difference between in-phase and quadrature LO signals to 90 degrees. The amplitudes of the phase-corrected LO signals can be adjusted to have a desired amplitude by amplitude-correction circuitry to generate amplitude-and-phase-corrected LO signals. The amplitude-and-phase-corrected LO signals can be used to modulate in-phase and quadrature components of a baseband signal. The modulated products can be combined, gained, and filtered as necessary for wireless transmission, device testing, or other purpose.

In these and other embodiments of the present invention, the phase-detection and correction circuitry can include a phase-detect mixer, a first phase-correction mixer, and a second phase-correction mixer. The phase-detect mixer can be coupled to modulate the amplitude-and-phase-corrected LO signals to provide a phase-correction signal. The phase-correction signal can have an amplitude proportional to a deviation in phase from 90 degrees between the amplitude-and-phase-corrected LO signals and a polarity that depends on the direction of the phase error. The first phase-correction mixer can modulate the phase-correction signal with the quadrature LO signal from the quadrature hybrid to generate an output that is then summed by a first summing circuit with the in-phase LO signal from the quadrature hybrid. A second phase-correction mixer can modulate the phase-correction signal with the in-phase LO signal from the quadrature hybrid to generate an output that is then summed by a second summing circuit with the quadrature LO signal from the quadrature hybrid. The output of the first summing circuit and the output of the second summing circuit can provide phase-corrected in-phase and quadrature LO signals having an accurate 90 degree phase difference.

In these and other embodiments of the present invention, the phase-detection and correction circuitry can include a first phase-detect mixer, a second phase-detect mixer, and a phase-correction mixer. The first and second phase-detect mixers can be coupled to modulate the amplitude-and-phase-corrected LO signals to provide a phase-correction signal. The phase-correction signal can have an amplitude proportional to a deviation in phase from 90 degrees between the amplitude-and-phase-corrected LO signals and a polarity that depends on the direction of the phase error. Specifically, a first phase-detect mixer can modulate the amplitude-and-phase-corrected in-phase LO signal with the amplitude-and-phase-corrected quadrature LO signal. A second phase-detect mixer can modulate the amplitude-and-phase-corrected quadrature LO signal with the amplitude-and-phase-corrected in-phase LO signal. The outputs of the first and second phase-detect mixers can be added. The sum can be filtered and provided to a phase-correction mixer as a low-frequency phase-correction signal. This phase-correction signal can control an amplitude and direction of a bias current through the phase-correction mixer. The phase-correction mixer can receive the in-phase LO signal from the quadrature hybrid through a first power splitter and the quadrature LO signal from the quadrature hybrid through a second power splitter. The phase-correction mixer can provide an output to the first power splitter where it can be combined with the in-phase LO signal from the quadrature hybrid. The phase-correction mixer can also provide an output to the second power splitter where it can be combined with the quadrature LO signal from the quadrature hybrid. The output of the first power splitter and the second power splitter can provide phase-corrected in-phase and quadrature signals having an accurate 90 degree phase difference.

In these and other embodiments of the present invention, the phase-detection and correction circuitry can include a phase-detect mixer and a phase-correction mixer. The phase detect mixer can be coupled to modulate the amplitude-and-phase-corrected LO signals to provide a phase-correction signal. The phase-correction signal can have an amplitude proportional to a deviation in phase from 90 degrees between the amplitude-and-phase-corrected LO signals and a polarity that depends on the direction of the phase error. The phase-correction mixer can receive the in-phase LO signal from the quadrature hybrid through a first power splitter and the quadrature LO signal from the quadrature hybrid through a second power splitter. The phase-correction signal can be added to either of the coupled in-phase LO signal or the quadrature LO signal, depending on the polarity of the phase-correction signal. The phase-correction mixer can provide an output to the first power splitter where it can be combined with the in-phase LO signal from the quadrature hybrid. The phase-correction mixer can also provide an output to the second power splitter where it can be combined with the quadrature LO signal from the quadrature hybrid. The output of the first power splitter and the second power splitter can provide phase corrected in-phase and quadrature signals having an accurate 90 degree phase difference.

These and other embodiments of the present invention can provide a quadrature modulator having phase-splitting circuitry. The phase-splitting circuitry can replace a quadrature hybrid that might otherwise be necessary. A phase-detect mixer coupled to modulate amplitude-and-phase-corrected LO signals can provide a phase-correction signal. The phase-correction signal can have an amplitude proportional to a deviation in phase from 90 degrees between the amplitude-and-phase-corrected LO signals and a polarity that depends on the direction of the phase error. The phase-splitting circuitry can include an RC network in the path of an LO signal to generate an in-phase LO signal and a CR network in a path of the LO signal to generate a quadrature LO signal. The amplitude of the in-phase LO signal summed with the phase-correction signal can be compared to the amplitude of the quadrature LO signal and a difference can be determined. The difference between these amplitudes can be used to adjust the capacitors in the input RC and CR networks such that the phase between the in-phase LO signal and quadrature LO signal is 90 degrees. The amplitudes of the phase-corrected in-phase LO signal and quadrature LO signal can be adjusted to a desired amplitude using amplitude-correction circuitry. The amplitude-and-phase-corrected LO signals can be used to modulate in-phase and quadrature components of a baseband signal. The modulated products can be combined, gained, and filtered as necessary for wireless transmission, device testing, or other purpose.

In these and other embodiments of the present invention, an amplitude-correction circuit can comprise a variable-gain amplifier. An amplitude of an output of the variable-gain amplifier can be detected using a power-detect circuit. The detected amplitude can be compared to a reference voltage. A difference between the detected amplitude and the reference voltage can be determined and used to adjust the gain of the variable-gain amplifier. Individual amplitude-correction circuits can be employed for each of the in-phase and quadrature LO signal paths in the modulator. The reference voltage can be calibrated, for example using a digital-to-analog converter. The reference voltage can instead be a voltage generated from a band-gap circuit. The reference voltage can instead be a portion of a supply voltage for the quadrature modulator circuit.

These and other embodiments of the present invention can employ one or more types of mixers. For example, some or all of the mixers can be double-balanced mixers, single-balanced mixers, ring-diode mixers, Gilbert multipliers, or other types of mixers. The power detectors can be formed of a series diode with a capacitor to ground, they can be area integrators, or they can be other types of circuits. The quadrature hybrid can be replaced with R-C and C-R networks in the in-phase and quadrature paths. The quadrature modulator can be formed on a single integrated circuit, or it can be implemented as a combination of different circuits.

Various embodiments of the present invention can incorporate one or more of these and the other features described herein. A better understanding of the nature and advantages of the present invention can be gained by reference to the following detailed description and the accompanying drawings.

DESCRIPTION OF ILLUSTRATIVE EMBODIMENTS

Figure 1:
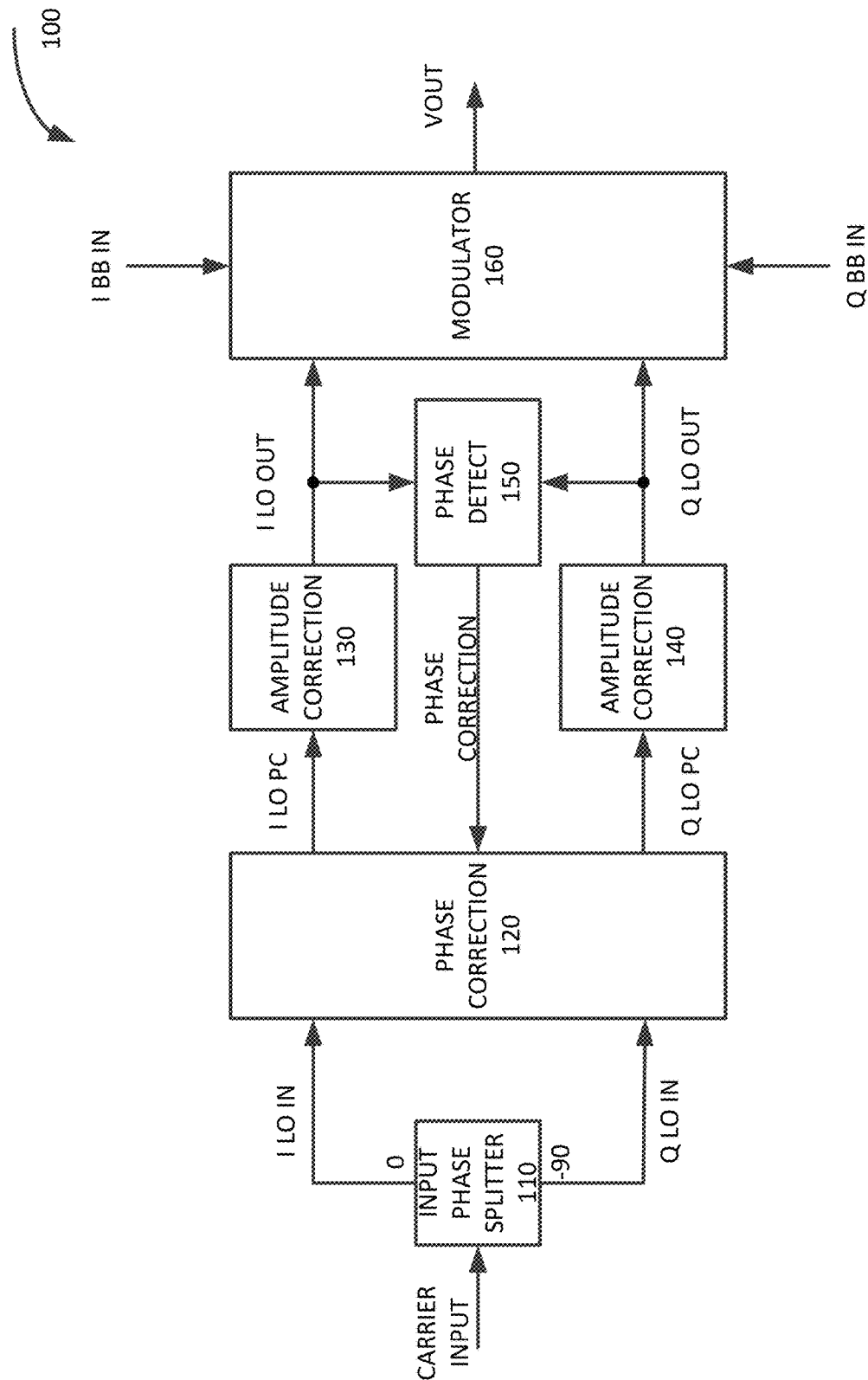
FIG. 1 illustrates a block diagram of a quadrature modulator according to an embodiment of the present invention.

FIG. 1 illustrates a block diagram of a quadrature modulator according to an embodiment of the present invention. This figure, as with the other included figures, is shown for illustrative purposes and does not limit either the possible embodiments of the present invention or the claims.

Quadrature modulator 100 can include phase-detection and correction circuitry including phase detect 150 and phase correction 120. Phase detect 150 and phase correction 120 can adjust a phase difference between the in-phase and quadrature LO signals at modulator 160 to be at least approximately 90 degrees. Quadrature modulator 100 can further include amplitude-correction circuitry including amplitude correction 130 and amplitude correction 140. Amplitude correction 130 and amplitude correction 140 can adjust the amplitudes of the in-phase and quadrature LO signals at modulator 160 to be at least approximately equal.

More specifically, quadrature modulator 100 can receive a carrier signal, or local oscillator signal, at input phase splitter 110. The local oscillator signal can be generated using a phase-lock loop, delay-locked loop, crystal, or other closed or open loop circuit (not shown.) Input phase splitter 110 can be a quadrature hybrid or other passive or active phase shift circuit. Input phase splitter 110 can provide in-phase and quadrature LO inputs I LO IN and Q LO IN to phase correction 120.

Phase correction 120 can provide a phase-corrected in-phase LO signal I LO PC to amplitude correction 130 and a phase-corrected quadrature LO signal Q LO PC to amplitude correction 140. Phase correction 120 can receive a phase-correction signal from phase detect 150, and responsive to the phase-correction signal, can adjust the phase of either or both the phase-corrected in-phase LO signal I LO PC or the phase-corrected quadrature LO signal Q LO PC such that a phase difference between them is at least approximately 90 degrees. That is, due to component mismatches and other factors, the phase difference can be offset from 90 degrees. Also, since the phase-correction can be time-varying, the phase difference can vary an amount around the offset phase.

Amplitude correction 130 can receive the phase-corrected in-phase LO signal I LO PC and adjust the amplitude to match a target amplitude. Similarly, amplitude correction 140 can receive the phase-corrected quadrature LO signal Q LO PC and adjust the amplitude to match a target amplitude. The target amplitudes can be the same, as in this example, though in these and other embodiments of the present invention, they can be different.

The amplitude-and-phase-corrected in-phase LO signal I LO OUT can be provided by amplitude correction 130 to phase detect 150 and modulator 160. The amplitude-and-phase-corrected quadrature LO signal Q LO OUT can be provided by amplitude correction 140 to phase detect 150 and modulator 160. Phase detect 150 can modulate the amplitude-and-phase-corrected in-phase LO signal I LO OUT with the amplitude-and-phase-corrected quadrature LO signal Q LO OUT. The product can then be filtered and provided to phase correction 120 as the phase-correction signal. Since the amplitude-and-phase-corrected signals are separated by 90 degrees, the product of the two signals can be expressed as:

$$V1\ cos(wct)*V1\ sin(wct+phi)=V1\ sin(phi)$$

where V1 is the target amplitude in amplitude correction 130 and amplitude correction 140, wct is the carrier frequency, and phi is the phase error from 90 degrees between the modulated signals. Simplified, this expression has a value of V1 sin(phi), which is zero in the absence of any phase error, and increases in magnitude with increasing deviation from 90 degrees for the phase between the modulated signals, and has a polarity that depends on the direction of derivation.

Modulator 160 can receive the amplitude-and-phase-corrected in-phase LO signal I LO OUT and the amplitude-and-phase-corrected quadrature LO signal Q LO OUT. Modulator 160 can further receive an in-phase baseband signal I BB IN and a quadrature baseband signal Q BB IN. Modulator 160 can modulate the amplitude-and-phase-corrected in-phase LO signal I LO OUT with the in-phase baseband signal I BB IN, and modulator 160 can modulate the amplitude-and-phase-corrected quadrature LO signal Q LO OUT with the quadrature baseband signal Q BB IN. Modulator 160 can sum and filter the modulator products and provide an output VOUT for wireless transmission, device testing, or other purpose.

Quadrature modulator 100 can correct the amplitude and phase of the I LO OUT and Q LO OUT signals over a wide range of frequencies. This can be particularly useful in testing wireless devices and components, for transmitting signals in compliance with multiple communication standards, and for other purposes.

In these and other embodiments of the present invention, phase detect 150 and phase correction 120 can be implemented using various topologies. These topologies can be implemented using various circuits. Examples of topologies provided by embodiments of the present invention are shown in the following three figures.

Figure 2:
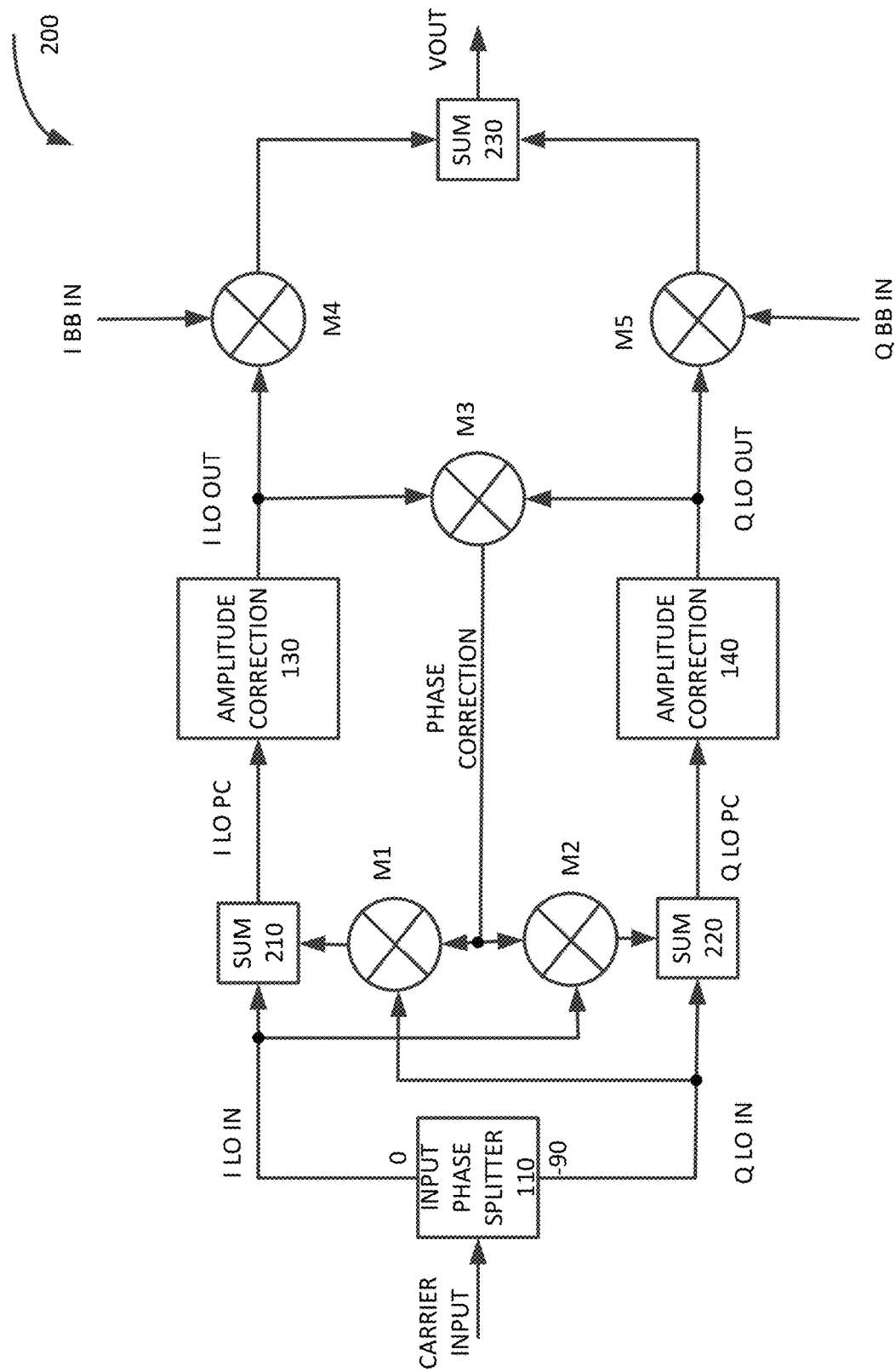
FIG. 2 illustrates an implementation of the block diagram of FIG. 1 according to an embodiment of the present invention.

FIG. 2 illustrates an implementation of the block diagram of FIG. 1 according to an embodiment of the present invention. A carrier signal or LO signal can be received by input phase splitter 110. The input phase splitter 110 can provide an in-phase LO signal I LO IN to mixer M2 and summing block 210, and a quadrature LO signal Q LO IN to mixer M1 and summing block 220. Mixer M1 can modulate the quadrature LO signal Q LO IN with the phase-correction signal from mixer M3, while mixer M2 can modulate the in-phase LO signal I LO IN with the phase-correction signal. Summing block 210 can sum the in-phase LO signal I LO IN with the product from mixer M1 to provide a phase-corrected in-phase signal I LO PC to amplitude correction 130, and summing block 220 can sum the quadrature LO signal Q LO IN with the product from mixer M2 to provide a phase-corrected quadrature signal Q LO PC to amplitude correction 140.

As before, amplitude correction 130 can receive the phase-corrected I LO PC and adjust the amplitude to match a target amplitude. Similarly, amplitude correction 140 can receive the phase-corrected Q LO PC and adjust the amplitude to match a target amplitude. Mixer M3 can modulate the amplitude-and-phase-corrected in-phase LO signal I LO OUT with the amplitude-and-phase-corrected quadrature LO signal Q LO OUT. The product can then be filtered by a filter (not shown) and provided to mixer M1 and mixer M2 as the phase-correction signal.

Mixer M4 can receive the amplitude-and-phase-corrected in-phase LO signal I LO OUT and mixer M5 can receive the amplitude-and-phase-corrected quadrature LO signal Q LO OUT. Mixer M4 can further receive an in-phase baseband signal I BB IN and mixer M5 can further receive a quadrature baseband signal Q BB IN. Mixer M4 can modulate the amplitude-and-phase-corrected in-phase LO signal I LO OUT with the in-phase baseband signal I BB IN, and mixer M5 can modulate the amplitude-and-phase-corrected quadrature LO signal Q LO OUT with the quadrature baseband signal Q BB IN. Summing block 230 can sum and filter the modulator products and provide an output VOUT for wireless transmission, device testing, or other purpose.

Mixer M1 and mixer M2 can act as combined attenuators and inverters. Combined with summing block 210 and summing block 220, the mixers M1 and M2 can adjust the relative phases of the phase-corrected LO signals I LO PC and Q LO PC. The direction of correction can be to reduce the phase difference or to increase the phase difference, and the direction can be determined by the polarity of the phase-correction signal. The amount of correction can be determined by the attenuation provided by the mixers M1 and M2, where the attenuation is determined by the magnitude of the polarity correction signal.

For example, when the phase-correction signal has a first polarity, mixer M1 can attenuate the quadrature LO signal and provide the attenuated quadrature LO signal to summing block 210, while mixer M2 can attenuate the in-phase LO signal and provide the attenuated in-phase LO signal to summing block 220. When the phase-correction signal has a second polarity, mixer M1 can invert and attenuate the quadrature LO signal and provide the inverted attenuated quadrature LO signal to summing block 210, while mixer M2 can invert and attenuate the in-phase LO signal and provide the inverted attenuated in-phase LO signal to summing block 220. Again, the amount of attenuation provided can depend on the amplitude of the phase-correction signal provided by mixer M3.

As an example, the in-phase LO signal I LO IN can be a cosine wave while the quadrature LO signal Q LO IN can be a sine wave. Adding a sine wave and a cosine wave can result in a signal having a phase between that of the sine wave and the cosine wave. More specifically, the sum of a sine wave and a cosine wave can be found by:

$$V1\cos(wct)+V2\sin(wct)=K\sin(wct+a\tan(V1/V2))$$

where wct is the carrier frequency, V1 is the amplitude of the cosine wave being added, V2 is the amplitude of the sine wave being added, K is the amplitude of the resulting waveform, and a tan is the arctangent function. This equation shows that a received in-phase LO signal can be phase shifted by adding (or subtracting) an attenuated quadrature LO signal and that a received quadrature LO signal can be phase shifted by adding (or subtracting) an attenuated in-phase LO signal.

Accordingly, when the phase-correction signal has the first polarity and the mixers do not invert, the phase of each of the phase-corrected signals I LO PC and Q LO PC can be shifted to be closer to each other, thereby reducing their phase difference. Subtracting a sine wave from a cosine wave can and subtracting a cosine wave from a sine wave can result in a signals having a greater phase difference than the phase difference between the sine wave and the cosine wave. Accordingly, when the phase-correction signal has the second polarity and the mixers invert, the phase of each of the phase-corrected signals I LO PC and Q LO PC can be shifted away from each other, thereby increasing their phase difference. The amount of phase shift can be determined by the level of attenuation provided by mixers M1 and M2. When no attenuation is provided and the phase-correction signal has the first polarity, the phase correction provided by mixer M1 and summing block 210 can be −45 degrees, while the phase correction provided by mixer M2 and summing block 220 can be +45 degrees. This amount of phase shift can align the phase-corrected signals I LO PC and Q LO PC with each other. When no attenuation is provided and the phase-correction signal has the second polarity, the phase correction provided by mixer M1 and summing block 210 can be +45 degrees, while the phase correction provided by mixer M2 and summing block 220 can be −45 degrees. This amount of phase shift can result in the phase-corrected signals I LO PC and Q LO PC being 180 degrees out of phase.

In these and other embodiments of the present invention, this amount of phase correction might not be needed. Accordingly, attenuators (not shown) can be inserted between mixer M1 and summing block 210 and between mixer M2 and summing block 220. These attenuators can reduce the range over which the phase of the in-phase LO signal and the quadrature LO signal can be corrected. These attenuators can also reduce the gain through the phase-correction loop thereby increasing its stability. This can help to reduce the effect of noise in the phase-correction loop. To further reduce noise, a filter (not shown) can be inserted between mixer M3 and the mixers M1 and M2. This filter can provide a dominant pole that can compensate the phase-correction loop.

The topology of quadrature modulator 200 can be implemented using various circuits. Input phase splitter 110 can be implemented using a quadrature hybrid. Mixer M1, mixer M2, and mixer M3 can be implemented using double-balanced mixers, single-balanced mixers, or other types of mixers. Summing block 210 and summing block 220 can be implemented using power splitters.

In these and other embodiments of the present invention, mixer M1 and mixer M2 as well as corresponding attenuators (not shown) can be implemented using a single mixer. This single mixer can provide either or both an attenuated quadrature LO signal to be summed with the in-phase LO signal or an attenuated in-phase LO signal to be summed with the quadrature LO signal. The amount of attenuation can be adjusted with the phase-correction signal. An example is shown in the following figure.

Figure 3:
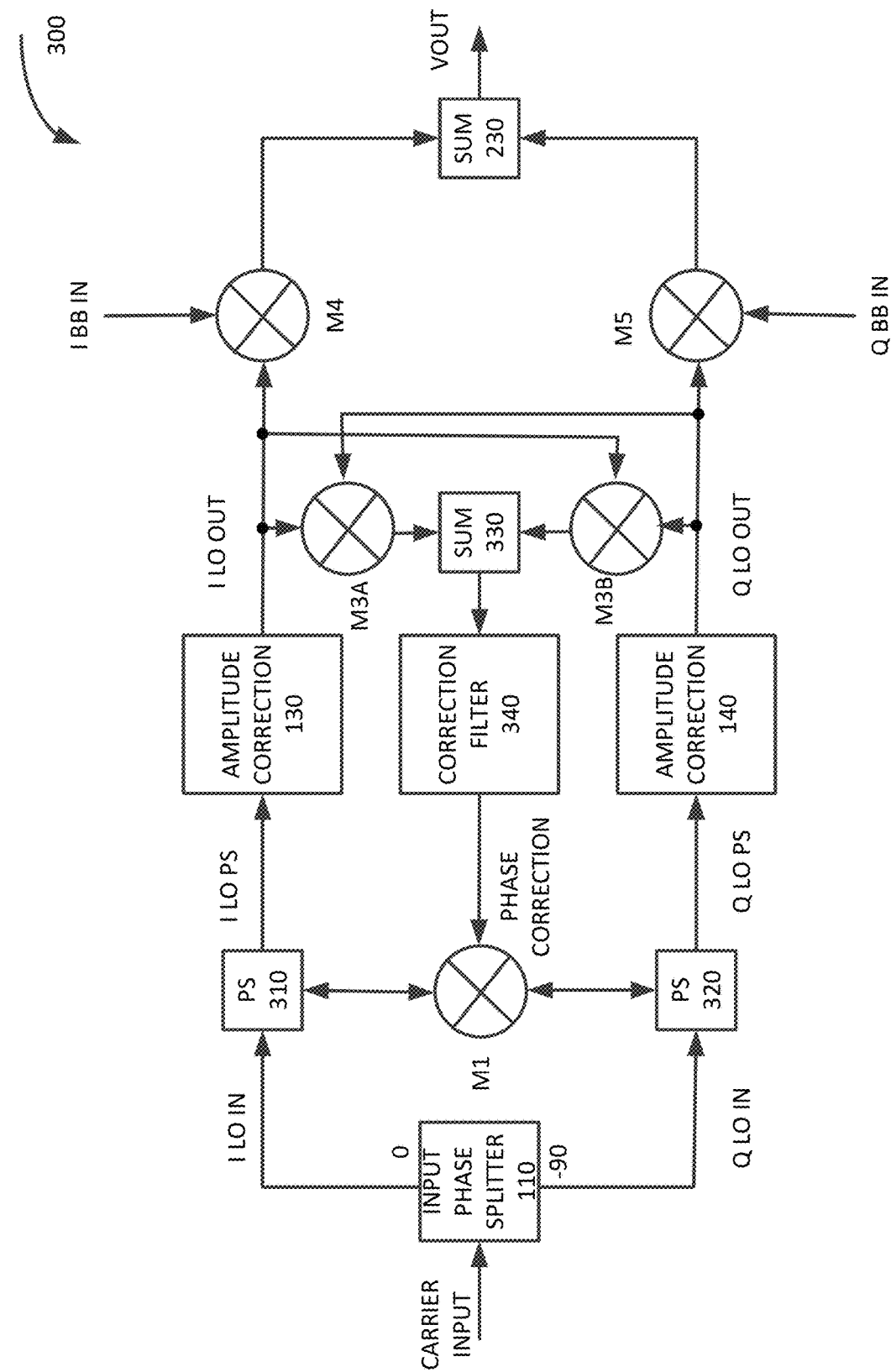
FIG. 3 illustrates another implementation of the block diagram of FIG. 1 according to an embodiment of the present invention.

FIG. 3 illustrates another implementation of the block diagram of FIG. 1 according to an embodiment of the present invention. As before, a carrier signal or LO signal can be received by input phase splitter 110. The input phase splitter 110 can provide an in-phase LO signal I LO IN to power splitter 310, and a quadrature LO signal Q LO IN to power splitter 320.

Mixer M1 can act as combined attenuator and inverter. Combined with power splitter 310 and power splitter 320, mixer M1 can adjust the relative phases of the phase-corrected LO signals I LO PC and Q LO PC. The direction of correction can be determined by the polarity of the phase-correction signal. The amount of correction can be determined by the attenuation provided by mixer M1, where the attenuation is determined by the magnitude of the polarity correction signal.

When the phase-correction signal has a first polarity, mixer M1 can provide an attenuated quadrature LO signal Q LO IN to power splitter 310 and mixer M1 can provide an attenuated in-phase LO signal I LO IN to power splitter 320. When the phase-correction signal has a second polarity, mixer M1 can provide an inverted attenuated quadrature LO signal Q LO IN to power splitter 310 and mixer M1 can provide an inverted attenuated in-phase LO signal I LO IN to power splitter 320. In this way, when the phase-correction signal has a first polarity, mixer M1 can add each input LO signal with a portion of the other LO signal. This can reduce a phase difference between the LO input signals. When the phase-correction signal has a second polarity, mixer M1 can subtract a portion of each input LO signal from the other LO signal. This can increase a phase difference between the LO input signals. The amount of attenuation, and therefore the amount of phase correction, can be determined by the magnitude of the phase-correction signal. Further attenuators (not shown) can be placed between power splitter 310 and mixer M1 and between power splitter 320 and mixer M1. These attenuators can be fixed or variable attenuators and their use can reduce the gain of the phase-correction loop and help to improve loop stability.

As before, amplitude correction 130 can receive the phase-corrected I LO PC and adjust the amplitude to match a target amplitude. Similarly, amplitude correction 140 can receive the phase-corrected Q LO PC and adjust the amplitude to match a target amplitude. Instead of a single mixer, quadrature modulator 300 can employ two mixers whose outputs are summed. This can help to improve symmetry and reduce offsets in the phase-correction signal.

Mixer M3A and mixer M3B can each modulate the amplitude-and-phase-corrected in-phase LO signal I LO OUT with the amplitude-and-phase-corrected quadrature LO signal Q LO OUT. The products can then be added by summing block 330, filtered by correction filter 340, and provided to mixer M1 as the phase-correction signal.

Mixer M4 can receive the amplitude-and-phase-corrected in-phase LO signal I LO OUT and mixer M5 can receive the amplitude-and-phase-corrected quadrature LO signal Q LO OUT. Mixer M4 can further receive an in-phase baseband signal I BB IN and mixer M5 can further receive a quadrature baseband signal Q BB IN. Mixer M4 can modulate the amplitude-and-phase-corrected in-phase LO signal I LO OUT with the in-phase baseband signal I BB IN, and mixer M5 can modulate the amplitude-and-phase-corrected quadrature LO signal Q LO OUT with the quadrature baseband signal Q BB IN. Summing block 230 can sum and filter the modulator products and provide an output VOUT for wireless transmission, device testing, or other purpose.

Figure 4:
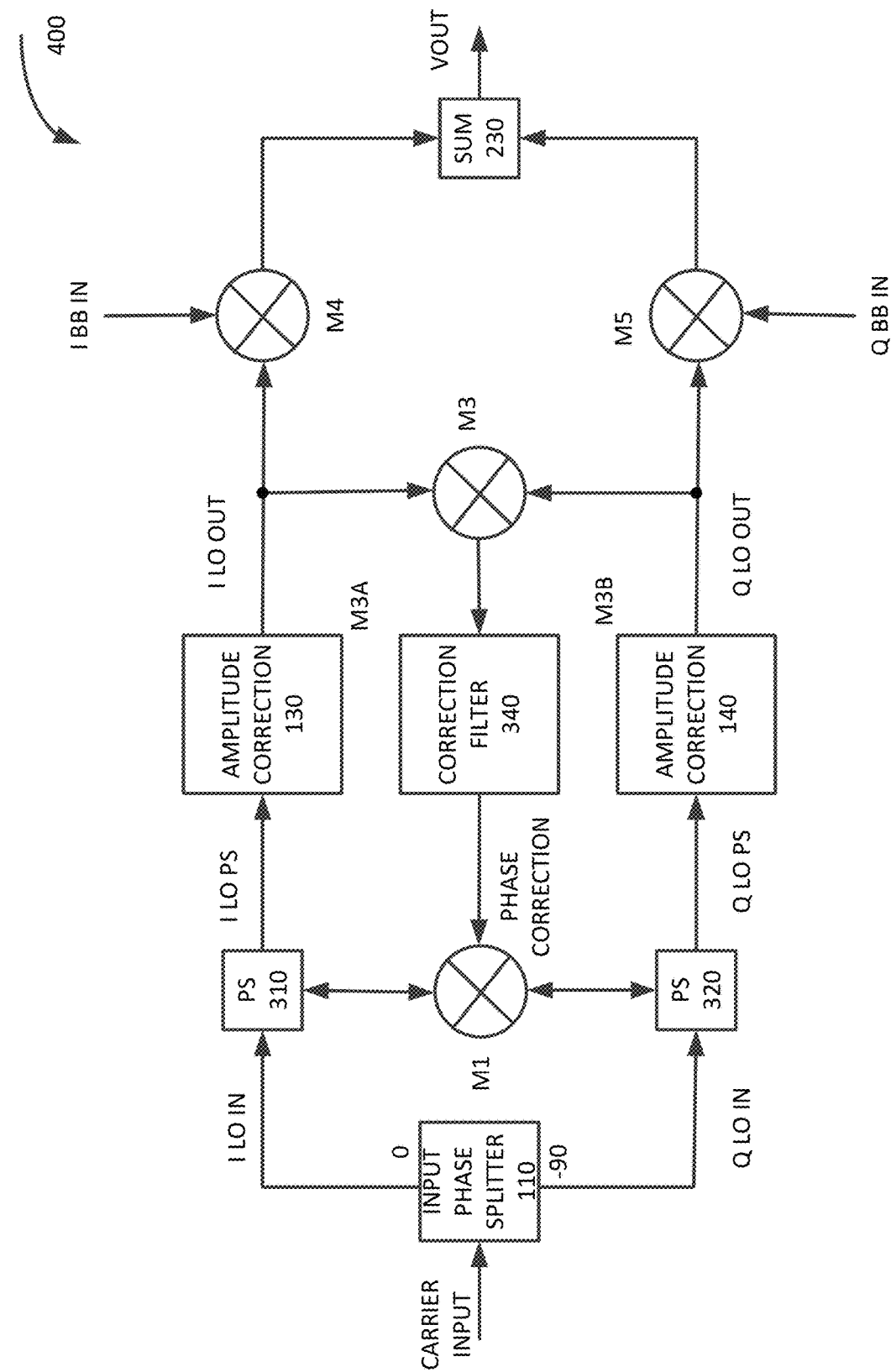
FIG. 4 illustrates another implementation of the block diagram of FIG. 1 according to an embodiment of the present invention.

FIG. 4 illustrates another implementation of the block diagram of FIG. 1 according to an embodiment of the present invention. As before, a carrier signal or LO signal can be received by input phase splitter 110. The input phase splitter 110 can provide an in-phase LO signal I LO IN to power splitter 310, and a quadrature LO signal Q LO IN to power splitter 320.

When the phase-correction signal has a first polarity, mixer M1 can provide an attenuated quadrature LO signal to power splitter 310 and mixer M1 can provide an attenuated in-phase LO signal to power splitter 320. When the phase-correction signal has a second polarity, mixer M1 can provide an inverted attenuated quadrature LO signal to power splitter 310 and mixer M1 can provide an inverted attenuated in-phase LO signal to power splitter 320. In this way, mixer M1 can provide an adjustment the in-phase LO signal I LO IN and the quadrature LO signal Q LO IN. The direction of correction can be determined by the polarity of the phase-correction signal and the amount of correction can be determined by the magnitude of the phase-correction signal. As before, further attenuators (not shown) can be placed between power splitter 310 and mixer M1 and between power splitter 320 and M1. These attenuators can be fixed or variable attenuators and their use can reduce a range over which the phases can be corrected, which can help reduce the effects of noise on the phase-correction loop. They can also reduce the gain of the phase-correction loop and help to improve loop stability.

As before, amplitude correction 130 can receive the phase-corrected I LO PC and adjust the amplitude to match a target amplitude. Similarly, amplitude correction 140 can receive the phase-corrected Q LO PC and adjust the amplitude to match a target amplitude. Mixer M3 can modulate the amplitude-and-phase-corrected in-phase LO signal I LO OUT with the amplitude-and-phase-corrected quadrature LO signal Q LO OUT. The product can then be filtered by correction filter 340 and provided to mixer M1 and mixer M2 as the phase-correction signal.

Mixer M4 can receive the amplitude-and-phase-corrected in-phase LO signal I LO OUT and mixer M5 can receive the amplitude-and-phase-corrected quadrature LO signal Q LO OUT. Mixer M4 can further receive an in-phase baseband signal I BB IN and mixer M5 can further receive a quadrature baseband signal Q BB IN. Mixer M4 can modulate the amplitude-and-phase-corrected in-phase LO signal I LO OUT with the in-phase baseband signal I BB IN, and mixer M5 can modulate the amplitude-and-phase-corrected quadrature LO signal Q LO OUT with the quadrature baseband signal Q BB IN. Summing block 230 can sum and filter the modulator products and provide an output VOUT for wireless transmission, device testing, or other purpose.

The topologies of quadrature modulator 200 (shown in FIG. 2), quadrature modulator 300 (shown in FIG. 3), and quadrature modulator 400 can be implemented using various circuits. Examples are shown in the following figures.

Figure 5:
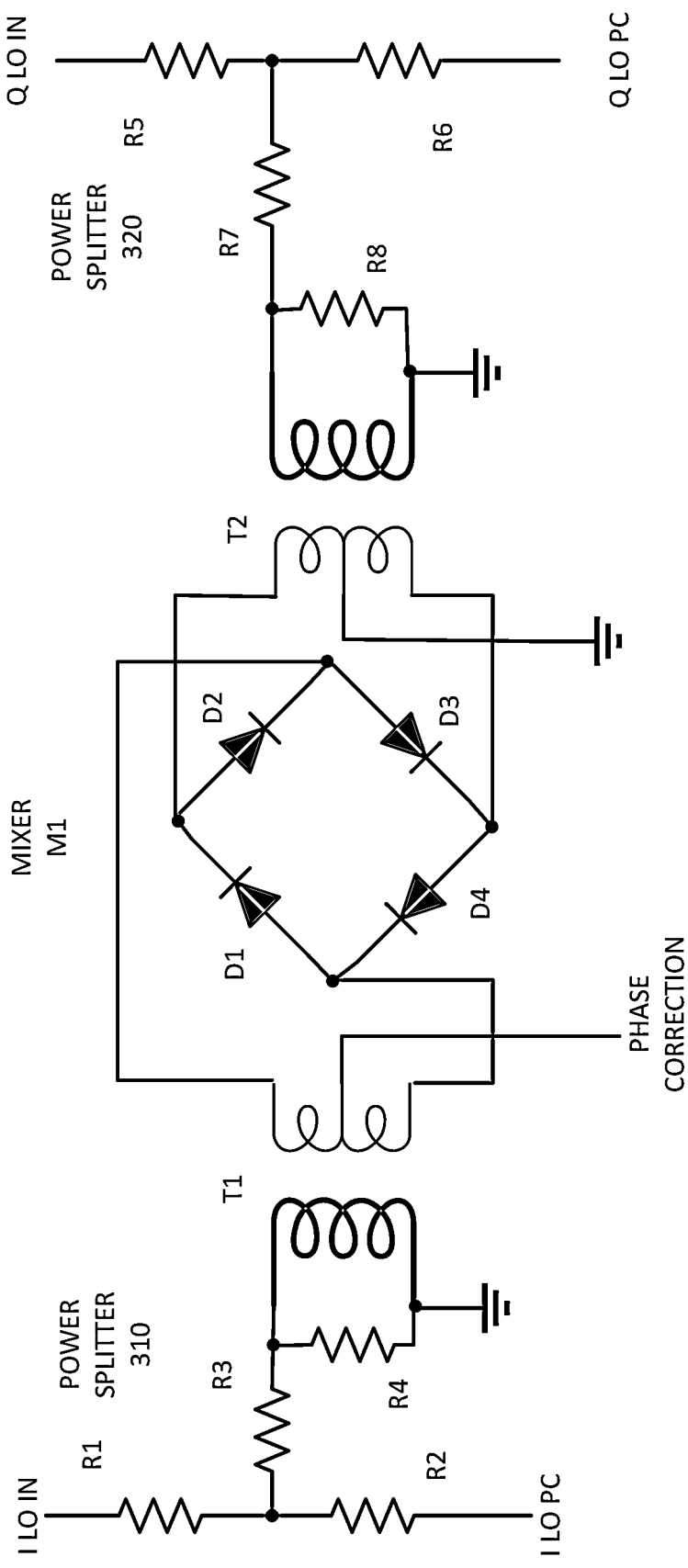
FIG. 5 illustrates a mixer and power splitters that can be used as a phase-correction circuit according to an embodiment of the present invention.

FIG. 5 illustrates a mixer and power splitters that can be used as a phase-correction circuit according to an embodiment of the present invention. Mixer M1 can be used as mixer M1 in FIG. 3 and FIG. 4 above. Power splitter 310 can include resistors R1, R2, R3, and R4. Power splitter 320 can include resistors R5, R6, R7 and R8. Mixer M1 can be a double-balanced mixer implemented as a ring diode that includes diodes D1, D2, D3, and D4. Power splitter 310 can be coupled to the ring diodes using transformer T1. Power splitter 310 can be coupled to receive the in-phase LO signal I LO IN and to provide the phase-corrected in-phase LO signal I LO PC. Power splitter 320 can be coupled to the ring diodes using transformer T2. Power splitter 320 can be coupled to receive the quadrature LO signal Q LO IN and to provide the phase-corrected quadrature LO signal Q LO PC.

Again, mixer M1 can act as combined attenuator and inverter. Combined with power splitter 310 and power splitter 320, mixer M1 can adjust the relative phases of the phase-corrected LO signals I LO PC and Q LO PC. The direction of correction can be determined by the polarity of the phase-correction signal. The amount of correction can be determined by the attenuation provided by mixer M1, where the attenuation is determined by the magnitude of the polarity correction signal.

A center tap on the ring diode side of transformer T1 can receive the phase-correction signal. The phase-correction signal can be a low-frequency or DC signal that can be above or below ground. The center tap on the ring diode side of transformer T2 can be grounded. When the phase-correction signal is above ground, diodes D1 and D3 can conduct and diodes D2 and D4 can be reversed biased and off. Current can flow into ground in each of the upper and lower windings of the diode side of transformer T2. When the magnitude of the phase-correction signal is low, diodes D1 and D3 can operate at low currents and the attenuation provided can be high. When the magnitude of the phase-correction signal is high, diodes D1 and D3 can operate at high currents and the attenuation provided can be low. An increasing voltage at I LO IN can cause current in the power splitter side of transformer T1 to flow to ground, which can induce a current in the diode side of transformer T1. This induced current can increase the current in diode D1 and decrease the current in diode D3. This can increase the current to ground through the top winding (as drawn) and reduce the current to ground through the bottom winding in the diode side of transformer T2. This current change in the diode side of transformer T2 can induce an increased current to ground in the phase-splitter side of transformer T2. This increase current to ground can increase a voltage at the common node of resistors R7 and R8. In this way mixer M1 can attenuate and add a non-inverted and attenuated I LO IN signal to Q LO IN in order to provide the phase corrected Q LO PC. Mixer M1 can similarly attenuate and add a non-inverted and attenuated Q LO IN signal to I LO IN in order to provide the phase corrected I LO PC.

When the phase-correction signal is below ground, diodes D2 and D4 can conduct and diodes D1 and D3 can be reversed biased and off. Current can flow from ground in each of the upper and lower windings of the diode side of transformer T2. When the magnitude of the phase-correction signal is high, diodes D2 and D4 can operate at high currents and the attenuation provided can be low. When the magnitude of the phase-correction signal is low, diodes D2 and D4 can operate at low currents and the attenuation provided can be high. An increasing voltage at I LO IN can cause current in the power splitter side of transformer T1 to flow to ground, which can induce a current in the diode side of transformer T1. This induced current can increase the current in diode D2 and decrease the current in diode D4. This can increase the current from ground through the top winding and reduce the current from ground through the bottom winding in the diode side of transformer T2. This current change in the diode side of transformer T2 can induce an increased current from ground in the phase-splitter side of transformer T2. This increase current from ground can decrease a voltage at the common node of resistors R7 and R8. In this way mixer M1 can invert and attenuate and add an inverted and attenuated I LO IN signal to Q LO IN in order to provide the phase corrected Q LO PC. Mixer M1 can similarly invert and attenuate and add an inverted and attenuated Q LO IN signal to I LO IN in order to provide the phase corrected I LO PC.

Figure 6:
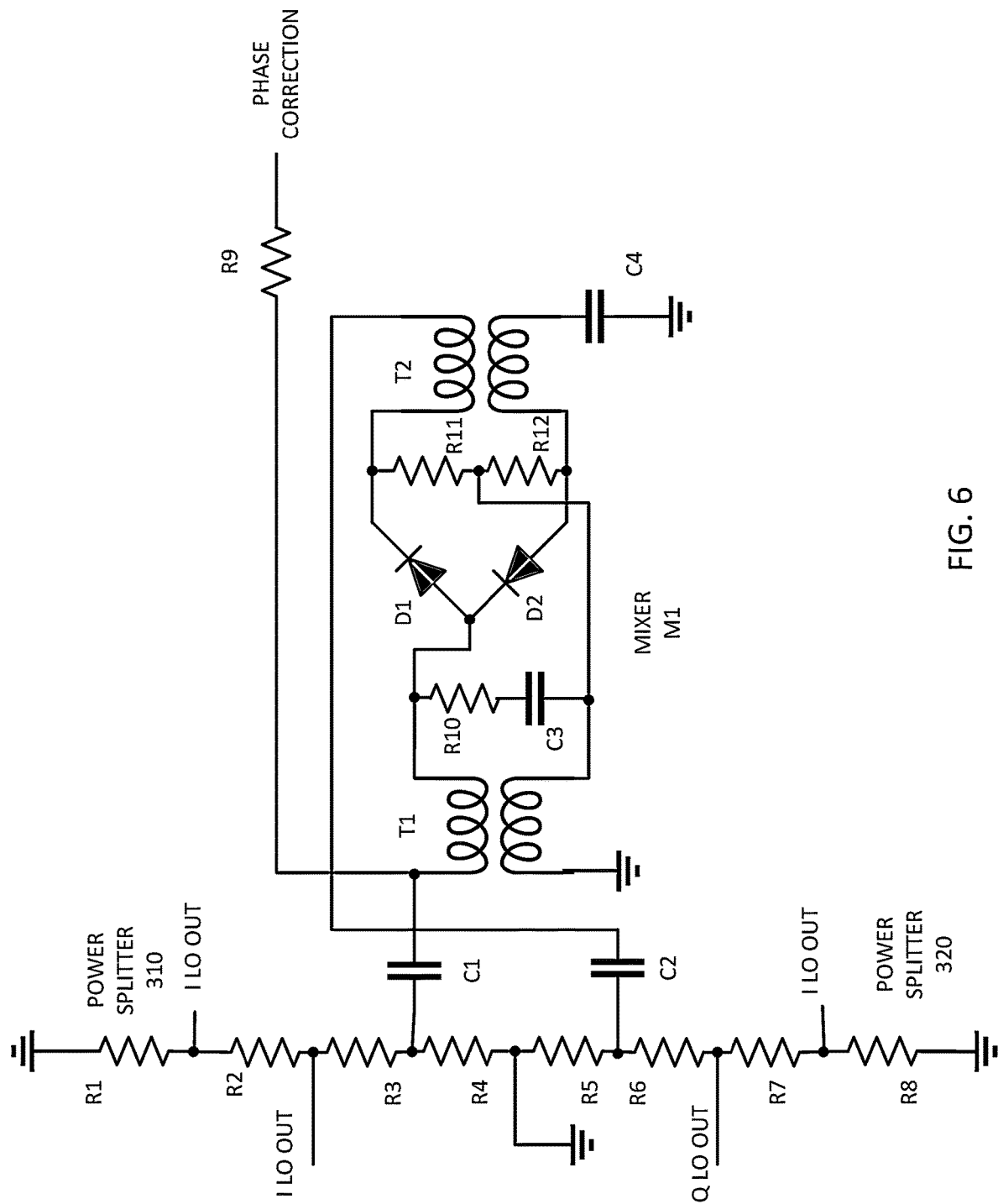
FIG. 6 illustrates another mixer and power splitters that can be used as a phase-correction circuit according to an embodiment of the present invention.

FIG. 6 illustrates another mixer and power splitters that can be used as a phase-correction circuit according to an embodiment of the present invention. Mixer M1 can be used as mixer M1 in FIG. 3 and FIG. 4 above. Power splitter 310 can include resistors R1, R2, R3, and R4. Power splitter 320 can include resistors R5, R6, R7 and R8. Mixer M1 can be a single-balanced mixer implemented using diodes D1 and D2. Power splitter 310 can be coupled through capacitor C1 to diodes D1 and D2 using a single-ended-to-differential circuit implemented using balun T1. The-phase-correction signal can be received through resistor R9 at the common node of capacitor C1 and balun T1. Power splitter 320 can be coupled through capacitor C2 to diodes D1 and D2 using a single-ended-to-differential circuit implemented using balun T2. Diodes D1 and D2 can be PIN junction diodes or other types of diodes. PIN diodes D1 and D2 can be comparatively linear devices and their use can reduce some of the distortion that can occur when nonlinear devices, such a PN diodes, are used. Capacitors C1, C2, C3, and C4 can provide a high-impedance for low-frequency signal components (a DC block) and a low-impedance for high frequency signal components (a short.) Resistors R11 and R12 can be a first termination resistor and resistor R10 can be a second termination resistor, where the termination resistors can be included to avoid reflections. Power splitter 310 can be coupled to receive the in-phase LO signal I LO IN and to provide the phase-corrected in-phase LO signal I LO PC. Power splitter 320 can be coupled to receive the quadrature LO signal Q LO IN and to provide the phase-corrected quadrature LO signal Q LO PC.

When the phase-correction signal is above ground, diode D1 can be forward biased and D2 can be reversed biased and off. Current can flow through R9, the top winding (as drawn) of balun T1, diode D1, R11, and the bottom winding of balun T1 to ground. When the magnitude of the phase-correction signal is high, diode D1 can operate at high currents and the attenuation provided can be low. When the magnitude of the phase-correction signal is low, diode D1 can operate at low currents and the attenuation provided can be high. An increasing voltage at I LO IN can cause current in the top winding of balun T1 to increase. This current can increase the current in diode D1, which can increase the current through the top winding of balun T2. This current change in balun T2 can decrease a voltage at the common node of resistors R5 and R6. In this way, mixer M1 can invert and attenuate and add an inverted and attenuated I LO IN signal to Q LO IN in order to provide the phase corrected Q LO PC. Mixer M1 can similarly invert and attenuate and add an inverted and attenuated Q LO IN signal to I LO IN in order to provide the phase corrected I LO PC.

When the phase-correction signal is below ground, diode D2 can be forward biased and D1 can be reversed biased and off. Current can flow from ground, through the bottom winding of balun T1, through R12 and D2, through the top winding of balun T1 and R9, and into the source of the phase-correction circuit. When the magnitude of the phase-correction signal is high, diode D2 can operate at high currents and the attenuation provided can be low. When the magnitude of the phase-correction signal is low, diode D2 can operate at low currents and the attenuation provided can be high. An increasing voltage at I LO IN can cause current in the top winding of balun T1 to decrease. This change can decrease the current in diode D2, which can cause current to flow from ground and through the bottom winding of balun T2. Current in to bottom winding of T2 can induce a current in the top winding of balun T1. This current change in balun T2 can increase a voltage at the common node of resistors R5 and R6. In this way mixer M1 can attenuate and add an attenuated I LO IN signal to Q LO IN in order to provide the phase corrected Q LO PC. Mixer M1 can similarly attenuate and add an attenuated Q LO IN signal to I LO IN in order to provide the phase corrected I LO PC.

Figure 7:
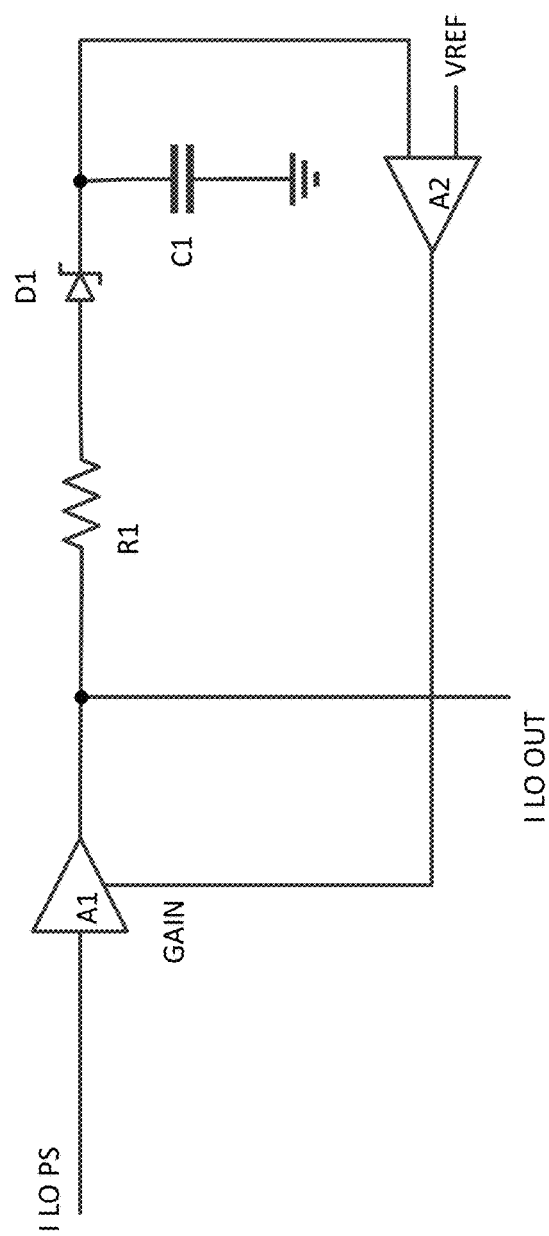
FIG. 7 illustrates an amplitude-correction circuit according to an embodiment of the present invention.

FIG. 7 illustrates an amplitude-correction circuit according to an embodiment of the present invention. This amplitude correction circuit can be used as amplitude correction 130 and amplitude correction 140. Variable-gain amplifier A1 can receive the phase-corrected in-phase LO signal I LO PS and provide an amplitude-and-phase-corrected in-phase LO signal I LO OUT. The amplitude of the output signal can be captured using a power detector formed by Schottky diode D1 and capacitor C1, where the diode D1 can be a zero-bias Schottky diode for improved accuracy. The amplitude of the output signal can be compared to a reference voltage VREF by comparison circuit A2. The output of comparison circuit A2 can adjust the gain of variable-gain amplifier A1 to match. By using the same reference voltage VREF in both amplitude correction 130 and amplitude correction 140, the amplitude of the amplitude-and-phase-corrected in-phase LO signal I LO OUT and the amplitude of the amplitude-and-phase-corrected quadrature LO signal Q LO OUT can both be adjusted to the same level.

Figure 8:
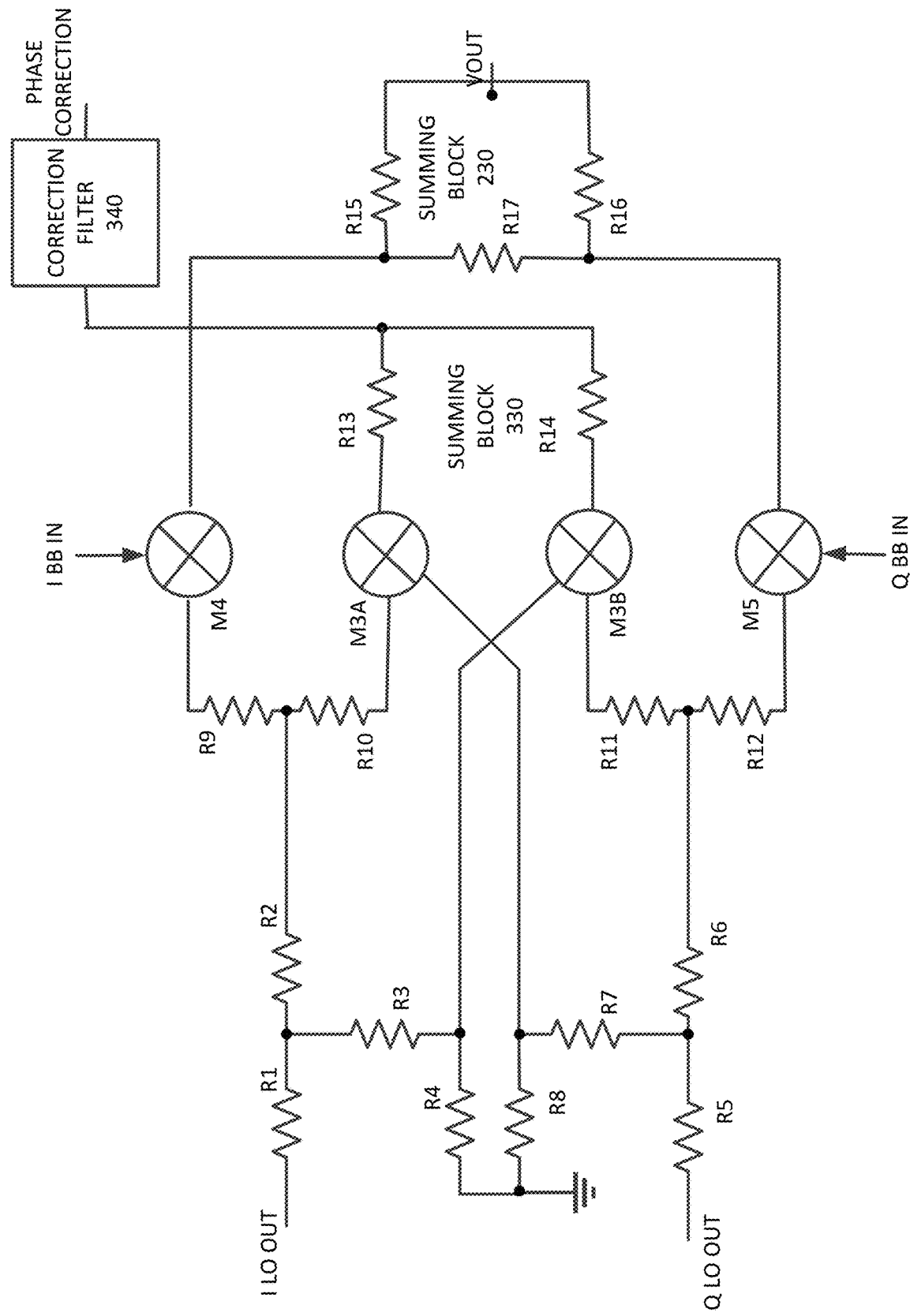
FIG. 8 illustrates a phase detect and modulator circuit according to an embodiment of the present invention.
Figure 9:
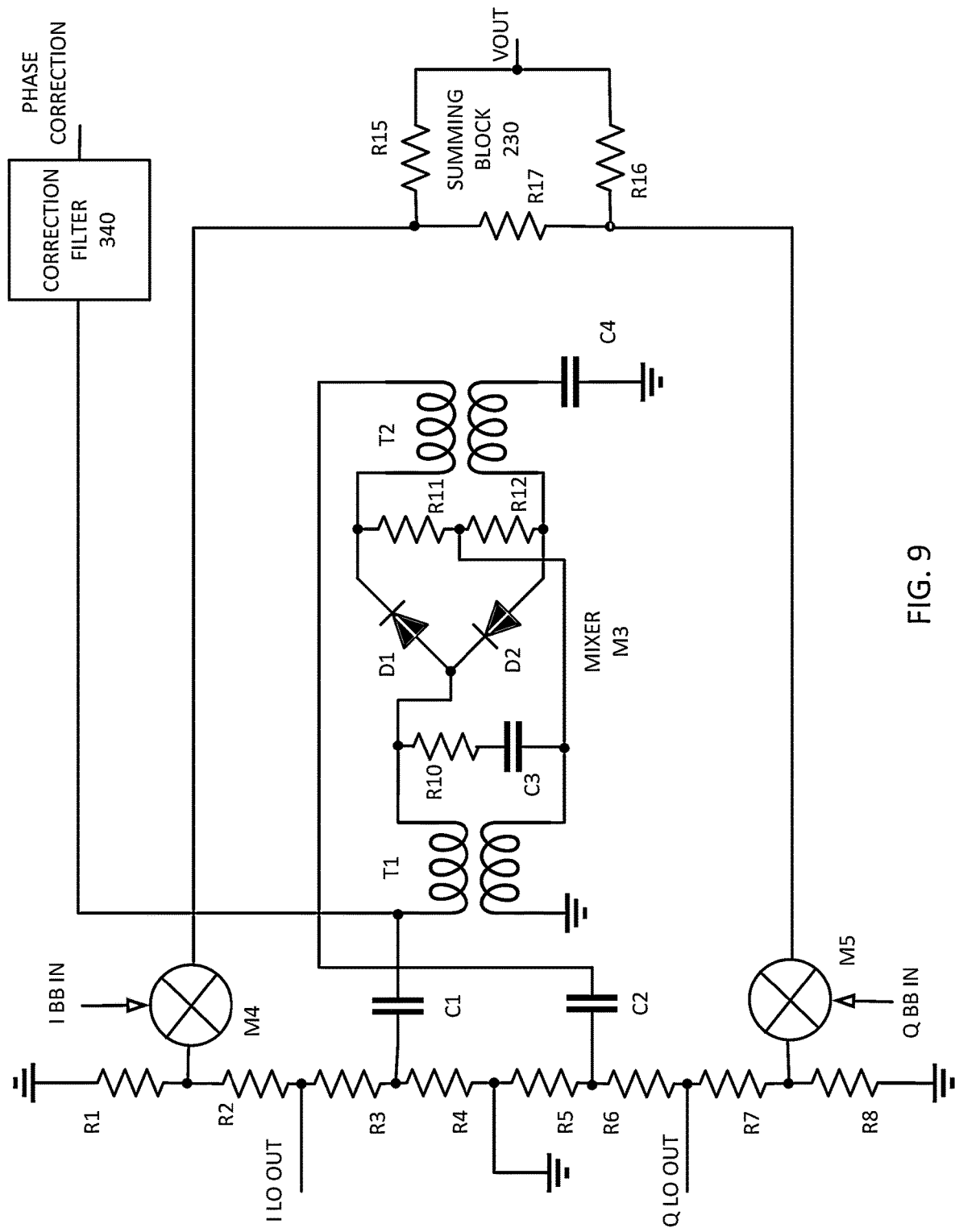
FIG. 9 illustrates another phase detect and modulator circuit according to an embodiment of the present invention.

It should be noted that for amplitude correction 130, resistor R1 can be the sum of resistors R1 and R2 in the phase detect and modulator circuit shown in FIG. 8, while R1 can be omitted when the phase detect and modulator circuit shown in FIG. 9 is used. Similarly, for amplitude correction 140, resistor R1 can be the sum of resistors R5 and R6 in the phase detect and modulator circuit shown in FIG. 8, while R1 can be omitted when the phase detect and modulator circuit shown in FIG. 9 is used.

In these and other embodiments of the present invention, the power detector formed by diode D1 and capacitor C1 can instead be an area detector or integrator that accumulates an area under the curve of a rectified input signal. The comparison circuit A2 can be an amplifier, a comparator, or other circuit.

FIG. 8 illustrates a phase detect and modulator circuit according to an embodiment of the present invention. This circuitry can be used as phase detect and modulator circuitry in FIG. 2, FIG. 3, and FIG. 4. The amplitude-and-phase-corrected in-phase LO signal I LOUT OUT can be received by a power splitter including resistors R1, R2, R3, and R4, which can be coupled to mixer M3B, as well as a 2R resistor splitter including resistors R9 and R10. Resistor R9 can be further coupled to mixer M4 and resistor R10 can be further coupled to mixer M3A. The amplitude-and-phase-corrected quadrature LO signal Q LO OUT can be received by a power splitter including resistors R5, R6, R7, and R8, which can be coupled to mixer M3A, as well as a 2R resistor splitter including resistors R11 and R12. Resistor R11 can be further coupled to mixer M3B and resistor R12 can be further coupled to mixer M5. Mixers M3A and M3B can modulate their received signals and the products can be summed by summing block 330, which is shown here as resistors R13 and R14, and filtered using correction filter 340 and provided as the phase-correction signal. The common node of the 2R resistor splitter including resistors R9 and R10 can be connected to the power detector diode D1 and capacitor C1 (shown in FIG. 7) of amplitude correction 130, while the common node of the 2R resistor splitter including resistors R11 and R12 can be connected to the power detector diode D1 and capacitor C1 of amplitude correction 140.

Mixer M4 can further receive an in-phase baseband signal I BB IN and mixer M5 can further receive a quadrature baseband signal Q BB IN. Mixer M4 can modulate an attenuated amplitude-and-phase-corrected in-phase LO signal I LO OUT with the in-phase baseband signal I BB IN, and mixer M5 can modulate an attenuated amplitude-and-phase-corrected quadrature LO signal Q LO OUT with the quadrature baseband signal Q BB IN. Summing block 230, including resistors R15, R16, and R17, can sum and filter the modulator products and provide the output VOUT for wireless transmission, device testing, or other purpose.

In this example, mixer M4 can modulate an attenuated amplitude-and-phase-corrected in-phase LO signal I LO OUT with the in-phase baseband signal I BB IN, and mixer M5 can modulate an attenuated amplitude-and-phase-corrected quadrature LO signal Q LO OUT with the quadrature baseband signal Q BB IN. The attenuation to the phase-corrected in-phase LO signal I LO OUT can be due to the 2R resistor splitter R9 and R10, and the attenuation of amplitude-and-phase-corrected quadrature LO signal Q LO OUT can be due to the 2R resistor splitter R11 and R12. When resistors R9, R10, R11, and R12 are equal, the power delivered to mixers M3A, M3B, M4, and M5 can be matched. Using matching mixers along with the matching input signals allows the phase-error measuring mixers M3A and M3B to accurately match the signal output mixers M4 and M5. Matching can be further improved using a Peltier cooler, Peltier heater, heatsink, or other thermal structure, by using isolated ground planes and other techniques for mixers M3A, M3B, M4, and M5.

While splitting power equally between mixer M3A and M4 and between mixers M3B and M5 can provide for good matching, in some embodiments, for noise and other reasons, it can be desirable to provide more power to the actual output signal generated by mixers M4 and M5, and less power to the phase-correction loop mixers M3A and M3B. Accordingly, embodiments of the present invention can provide low-power phase detectors such that power can be increased to the output modulator mixers M4 and M5. An example is shown in the following figure.

FIG. 9 illustrates another phase detect and modulator circuit according to an embodiment of the present invention. This circuitry can be used as phase detect and modulator circuitry in FIG. 2, FIG. 3, and FIG. 4. The amplitude-and-phase-corrected in-phase LO signal I LOUT OUT can be received by a first power splitter including resistors R1, R2, R3, and R4. The amplitude-and-phase-corrected quadrature LO signal Q LO OUT can be received by a second power splitter including resistors R5, R6, R7, and R8. Mixer M3 can be a single-balanced mixer implemented using diodes D1 and D2. The first power splitter can be coupled to mixer M4 and through capacitor C1 to diodes D1 and D2 of mixer M3 using a single-ended-to-differential circuit implemented using balun T1. The second power splitter can be coupled to mixer M5 and through capacitor C2 to diodes D1 and D2 of mixer M3 using a single-ended-to-differential circuit implemented using balun T2. In this example, mixer M3 can be power-efficient. Accordingly, the first and second power splitters can be arranged to provide a majority of their power to mixers M4 and M5, respectively, while providing a reduced amount of power to mixer M3. Capacitors C1, C2, C3, and C4 can provide a high-impedance for low-frequency signal components (a DC block) and a low-impedance for high frequency signal components (a short.) Currents at the common node of capacitor C1 and balun T1 can be filtered using correction filter 340 and provided as the phase-correction signal. The power detector diode D1 and capacitor C1 (shown in FIG. 7) of amplitude correction 130 can be connected to receive the amplitude-and-phase-corrected in-phase LO signal I LO OUT, while the power detector diode D1 and capacitor C1 of amplitude correction 140 can be connected to receive the amplitude-and-phase-corrected quadrature LO signal Q LO OUT.

In this example, diodes D1 and D2 can be PN diodes that are biased on, for example using a DC current source that provides a current through diodes D1 and D2. Diodes D1 and D2 can instead be zero-bias Schottky diodes. Using zero-bias Schottky diodes can enable a reduction in the input voltage swing provided to mixer M3, which can allow additional power to be provided to the signal output mixers M4 and M5.

The operation of mixer M3 can be similar to that of mixer M1 in FIG. 5, with the exception that instead of current provided by a phase-correction signal being injected into mixer M1 to cause a phase shift, a phase shift can cause mixer M1 to provide a current to correction filter 340, which can provide the phase-correction signal.

As an example, I LO OUT can be a cosine wave while Q LO OUT can be a sine wave. Since these waveforms are multiplied by mixer M3, the direction of current into and out of correction filter 340 changes each quarter cycle. A phase shift from 90 degrees between the I LO OUT and Q LO OUT signals can result in a mismatch in the time that current flows into and out of correction filter 340. This can result in a net current into or out of correction filter 340, which can generate a phase-correction signal.

When I LO OUT is higher than Q LO OUT, current can flow through D1 and out of correction filter 340. When Q LO OUT is higher than I LO OUT, current can flow through D2 and into correction filter 340. When Q LO OUT and I LO OUT are separated by 90 degrees, the currents in diodes D1 and D2 turn off and on each quarter cycle. The currents through T1 also change each quarter cycle. As phase errors reduce the phase difference between the I LO OUT and Q LO OUT signals, I LO OUT can be higher than Q LO OUT for longer durations. This can result in diode D1 conducting longer and drawing net current from the correction filter 340, thereby reducing the phase-correction voltage. As phase errors increase the phase difference between the I LO OUT and Q LO OUT signals, Q LO OUT can be higher than I LO OUT for longer durations. This can result in diode D2 conducting for longer durations and providing net current into the correction filter 340, thereby increasing the phase-correction voltage.

Mixer M4 can further receive an in-phase baseband signal I BB IN and mixer M5 can further receive a quadrature baseband signal Q BB IN. Mixer M4 can modulate an attenuated amplitude-and-phase-corrected in-phase LO signal I LO OUT with the in-phase baseband signal I BB IN, and mixer M5 can modulate an attenuated amplitude-and-phase-corrected quadrature LO signal Q LO OUT with the quadrature baseband signal Q BB IN. Summing block 230, including resistors R15, R16, and R17, can sum and filter the modulator products and provide the output voltage VOUT for wireless transmission, device testing, or other purpose.

In these and other embodiments of the present invention, it can be desirable to replace the quadrature hybrid used for input phase splitter 110 with another phase-splitting circuit. An example is shown in the following figure.

Figure 10:
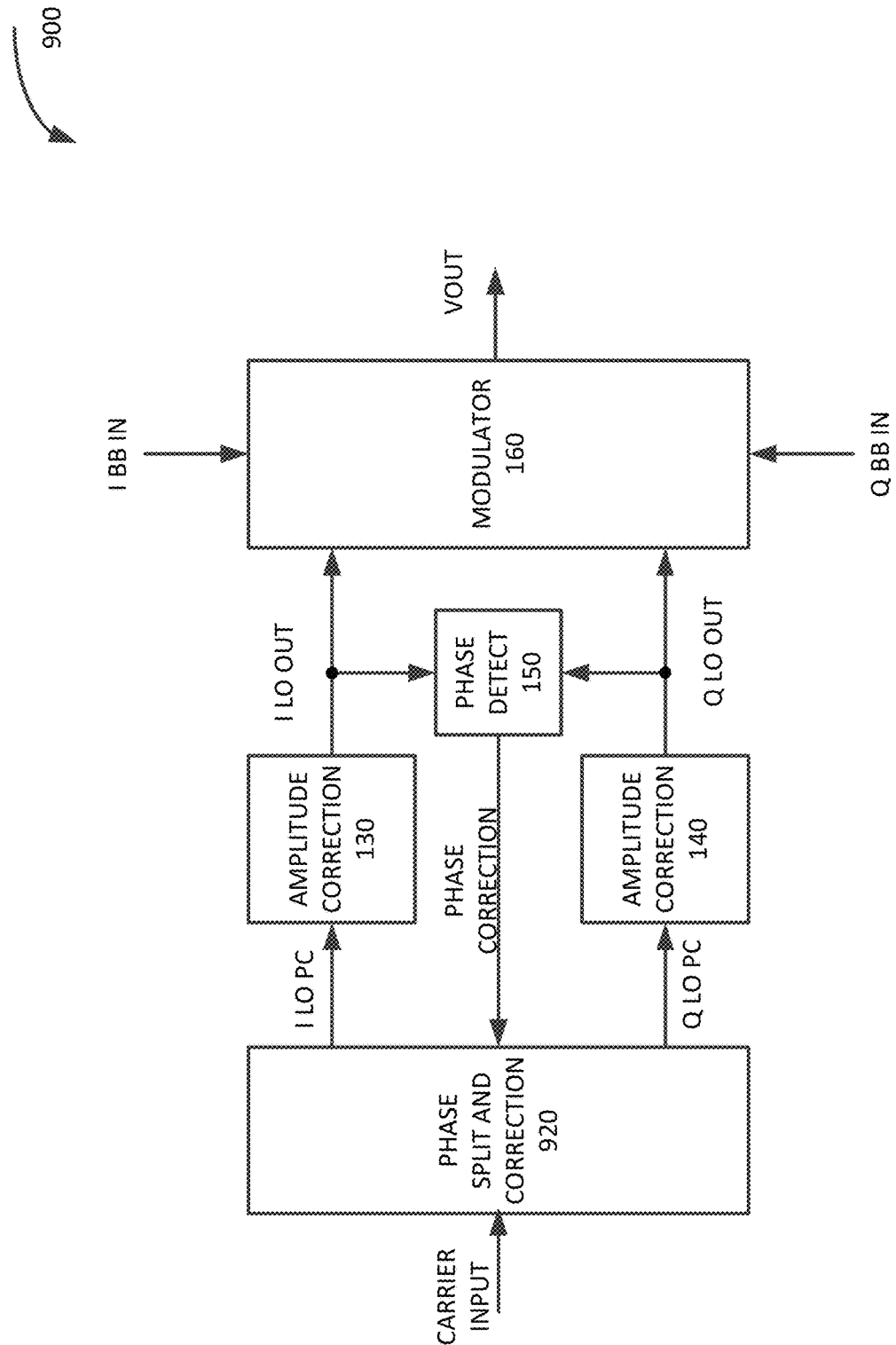
FIG. 10 illustrates another block diagram of a quadrature modulator according to an embodiment of the present invention.

FIG. 10 illustrates another block diagram of a quadrature modulator according to an embodiment of the present invention. Quadrature modulator 900 can include phase-detection and correction circuitry including phase detect 150 and phase-split and correction 920. Phase detect 150 and phase-split and correction 920 can provide in-phase and quadrature signals such that a phase difference between the in-phase and quadrature LO signals at modulator 160 can be at least approximately 90 degrees. Quadrature modulator 900 can further include amplitude correction circuitry including amplitude correction 130 and amplitude correction 140. Amplitude correction 130 and amplitude correction 140 can adjust the amplitudes of the in-phase and quadrature LO signals at modulator 160 to be at least approximately equal.

More specifically, quadrature modulator 900 can receive a carrier signal, or local oscillator signal, at phase-split and correction 920. The local oscillator signal can be generated using a phase-lock loop, delay locked-loop, crystal, or other closed or open loop circuit (not shown.) Phase-split and correction 920 can provide phase-corrected in-phase and quadrature LO inputs I LO PC to amplitude correction 130 and Q LO PC to amplitude correction 140.

Phase-split and correction 920 can receive a phase-correction signal from phase detect 150, and responsive to the phase-correction signal, can adjust the phase of either or both the phase-corrected in-phase LO signal I LO PC or the phase-corrected quadrature LO signal Q LO PC such that a phase difference between them is at least approximately 90 degrees. That is, due to component mismatches and other factors, the phase difference can be offset from 90 degrees. Also, since the phase-correction can be time-varying, the phase difference can vary an amount around the offset phase.

Amplitude correction 130 can receive the phase-corrected in-phase LO signal I LO PC and adjust the amplitude to match a target amplitude. Similarly, amplitude correction 140 can receive the phase-corrected quadrature LO signal Q LO PC and adjust the amplitude to match a target amplitude. The target amplitudes can be the same, as in this example, though in these and other embodiments of the present invention they can be different.

The amplitude-and-phase-corrected in-phase LO signal I LO OUT can be provided by amplitude correction 130 to phase detect 150 and modulator 160. The amplitude-and-phase-corrected quadrature LO signal Q LO OUT can be provided by amplitude correction 140 to phase detect 150 and modulator 160. Phase detect 150 can modulate the amplitude-and-phase-corrected in-phase LO signal I LO OUT with the amplitude-and-phase-corrected quadrature LO signal Q LO OUT. The product can then be filtered with a correction filter 340 (shown in FIG. 3) and provided to phase-split and correction 920 as the phase-correction signal.

Modulator 160 can receive the amplitude-and-phase-corrected in-phase LO signal I LO OUT and the amplitude-and-phase-corrected quadrature LO signal Q LO OUT. Modulator 160 can further receive an in-phase baseband signal I BB IN and a quadrature baseband signal Q BB IN. Modulator 160 can modulate the amplitude-and-phase-corrected in-phase LO signal I LO OUT with the in-phase baseband signal I BB IN, and modulator 160 can modulate the amplitude-and-phase-corrected quadrature LO signal Q LO OUT with the quadrature baseband signal Q BB IN. Modulator 160 can sum and filter the modulator products and provide output voltage VOUT for wireless transmission, device testing, or other purpose.

Phase-split and correction 920 can be implemented using various circuits. An example is shown in the following figure.

Figure 11:
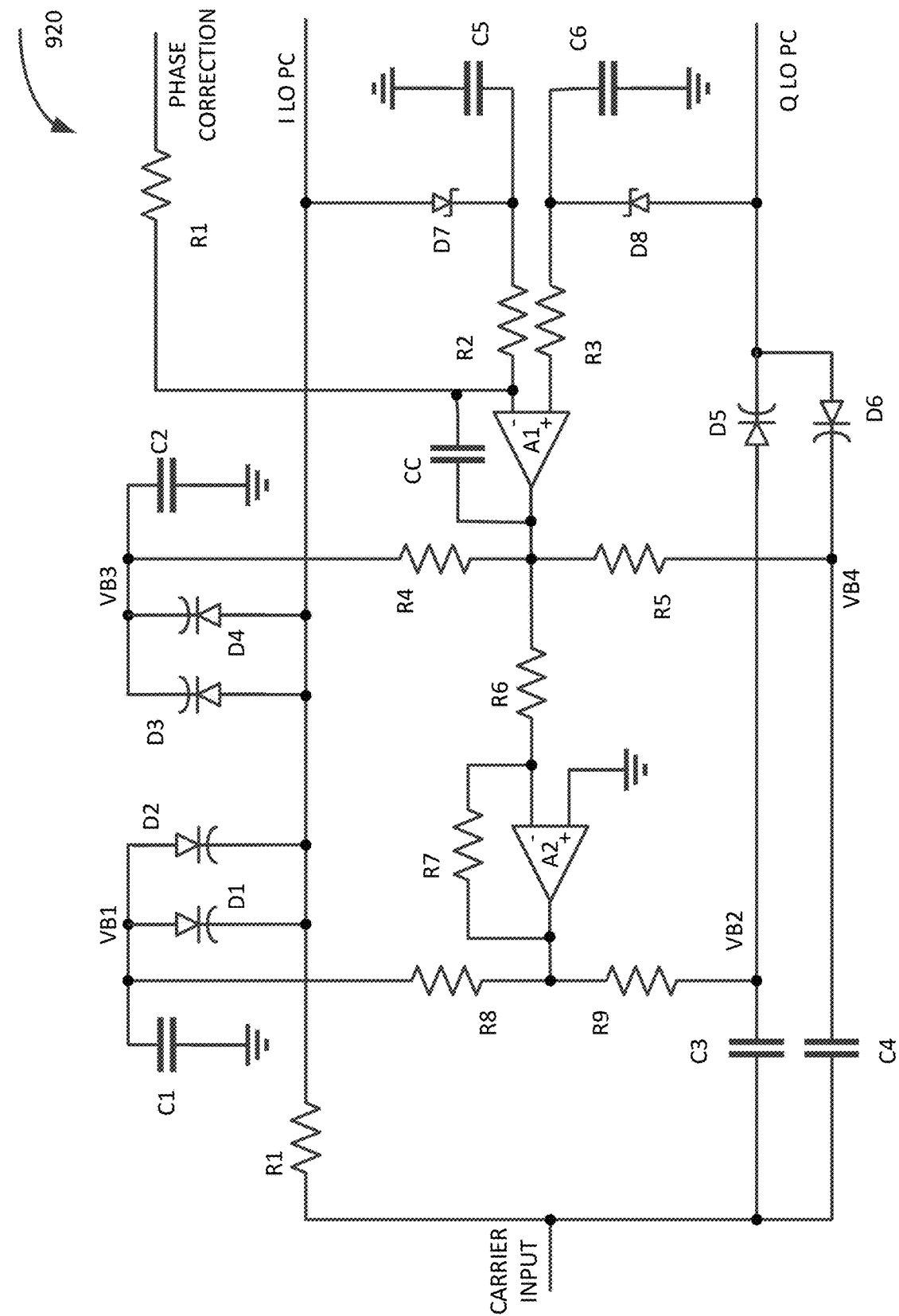
FIG. 11 illustrates a phase-split and correction circuit according to an embodiment of the present invention.

FIG. 11 illustrates a phase-split and correction circuit according to an embodiment of the present invention. Phase-split and correction 920 can receive a carrier input with an RC network to phase shift the carrier signal and provide a phase-corrected in-phase LO signal I LO PC. The RC network can include a series resistor R1 and a capacitance to ground, where the capacitance is formed of the parallel combination of varactor diodes D1 and D2 in series with capacitor C1, in parallel with the parallel combination of varactor diodes D3 and D4 in series with capacitor C2. Phase-split and correction 920 can receive the carrier input with a CR network to phase shift the carrier signal and provide a phase-corrected quadrature LO signal Q LO PC. The CR network can include the output impedance of the source of the carrier input (not shown) and a series capacitance that includes the parallel combination of capacitor C3 in series with varactor D5 and capacitor C4 in series with varactor D6.

The amplitude of the phase-corrected in-phase LO signal I LO PC can be captured using a power detector including diode D7 and capacitor C5, where diode D7 can be a zero-bias Schottky diode for improved accuracy. The amplitude of the phase-corrected quadrature LO signal Q LO PC can be captured using a power detector including diode D8 and capacitor C6, where diode D8 can be a zero-bias Schottky diode for improved accuracy. The difference between these amplitudes can be determined by amplifier A1 and provided to inverting amplifier A2. Amplifier A1 can provide bias voltage VB3 to varactor diodes D3 and D4, and bias voltage VB4 to varactor diode D6. Similarly, inverting amplifier A2 can provide bias voltage VB1 to varactor diodes D1 and D2, and bias voltage VB2 to varactor diode D5. The voltage of the phase-corrected in-phase LO signal I LO PC less the bias voltage VB1 can be the reverse bias voltage for diodes D1 and D2. The bias voltage VB3 less the voltage of the phase-corrected in-phase LO signal I LO PC can be the reverse bias voltage for diodes D3 and D4. Similarly, the voltage of the phase-corrected quadrature LO signal Q LO PC less the bias voltage VB2 can be the reverse bias voltage for diode D5. The bias voltage VB4 less the voltage of the phase-corrected quadrature LO signal Q LO PC can be the reverse bias voltage for D6.

When the amplitudes of the phase-corrected in-phase LO signal I LO PC and the phase corrected quadrature LO signal Q LO PC do not match, a differential voltage can appear at the input amplifier A1. This input can drive the output of amplifier A1 and the output of inverting amplifier A2 in a direction to change the capacitances of varactor diodes D1-D6 such that the amplitudes of the phase-corrected in-phase LO signal I LO PC and the phase corrected quadrature LO signal Q LO PC match.

For example, when the amplitude of the phase-corrected in-phase LO signal I LO PC is lower than the amplitude of the phase-corrected quadrature LO signal Q LO PC, the output of amplifier A1 can increase and the output of inverting amplifier A2 can decrease. This can decrease VB1, thereby increasing the reverse bias voltage on varactor diodes D1 and D2 and decreasing their capacitance. VB3 can increase, thereby increasing the reverse bias voltage on varactor diodes D3 and D4 and decreasing their capacitance. The voltage VB2 can decrease, thereby increasing the reverse bias voltage for varactor diode D5 and decreasing its capacitance. The voltage VB4 can increase, thereby increasing the reverse bias voltage and decreasing the capacitance of varactor diode D6. This decrease in capacitance can change the attenuation provided by the capacitances in the RC and CR networks. Since the impedance of a capacitor increases with decreasing capacitor value, the impedance of the capacitances in the RC network can increase. In the RC network, this increase in impedance can increase the amplitude of the phase-corrected in-phase LO signal I LO PC.

In this way, the capacitances in the RC and CR networks can be adjusted using the loop through the power detectors, amplifiers A1 and A2, and varactor diodes D1-D6 such that the amplitude of the phase-corrected in-phase LO signal I LO PC and the phase-corrected quadrature LO signal Q LO PC are equal. When these amplitudes are equal, the phase shift provided by the RC network can be 45 degrees and the phase shift provided by the CR network can be −45 degrees, for a difference of 90 degrees.

In this way, the amplitudes of the phase-corrected in-phase LO signal I LO PC and the phase-corrected quadrature LO signal Q LO PC can be used as a proxy for measuring a phase difference between the phase-corrected in-phase LO signal I LO PC and the phase-corrected quadrature LO signal Q LO PC. Since the phase difference does not need to be determined, phase-split and correction 920 does not include a mixer in this example.

Further phase correction can be provided by phase detect 150 (shown in FIG. 10.) Phase detect 150 can provide the phase-correction signal to either input of amplifier A1, depending on the polarity of the phase-correction signal. In this example, the phase-correction signal can be received through resistor R1 by the inverting input of amplifier A1. This signal can create an offset in the feedback loop including amplifier A1 and amplifier A2 that can cancel other errors, such as a phase mismatch between amplitude correction 130 and amplitude correction 140, such that amplitude-and-phase-corrected in-phase LO signal I LO OUT and amplitude-and-phase-corrected quadrature LO signal Q LO OUT have a phase difference of 90 degrees.

This circuit includes a first feedback loop nested inside a second feedback loop. That is, this circuit includes a double-integrator. Specifically, the loop through phase detect 150 can be a first loop having a second loop including the power detectors, amplifiers A1 and A2, and varactor diodes D1-D6 being a second nested loop. Accordingly, a compensation network around amplifier A1, shown here as CC around amplifier A1, can provide a dominant pole for both loops to maintain stability. The compensation network CC can be a capacitor, a capacitor in series with a resistor, or other combination of components. To cancel errors that can be caused by R1 and CC, equivalent networks (not shown) can be connected between the noninverting input of amplifier A1 and ground.

This circuit topology can provide for at least some cancellation of variations in varactor capacitance that can be due to the input LO signals. For example, the net voltages across varactor diodes D1, D2, D3, and D4 can vary with changes in the phase-corrected in-phase LO signal I LO PC. This change in voltage of the input LO signals can cause changes in varactor diode capacitance, which can cause variations in the phase and amplitude of both the phase-corrected in-phase LO signal I LO PC and the phase-corrected quadrature LO signal Q LO PC. Accordingly, the feedback loop of amplifiers A1 and A2 and varactor diodes D1-D6 can be arranged to at least mitigate this capacitance variation.

Again, the difference in amplitude between the phase-corrected in-phase LO signal I LO PC and the phase-corrected quadrature LO signal Q LO PC can be received at amplifier A1, which can provide bias voltages VB3 and VB4. The output of amplifier A1 can be inverted by amplifier A2, which can be configured to have unity gain by setting R6 to be equal to R7. The output of amplifier A2 can provide bias voltages VB1 and VB2. The bias voltages VB1-VB4 and varactor diodes D1 through D6 can be connected such that an increasing capacitance of a varactor diode due to a change in input voltage can be at least partially nullified by a decreasing capacitance of another varactor diode.

For example, as the voltage of the phase-corrected in-phase LO signal I LO PC decreases, the magnitude of the reverse bias voltage across varactor diodes D1 and D2 and can decrease and a magnitude of a reverse bias voltage across varactor diodes D3 and D4 can increase. This change in the voltage of the phase-corrected in-phase LO signal I LO PC can increase the capacitance of varactor diodes D1 and D2 while decreasing the capacitance of varactor diodes D3 and D4. To the extent that the increase in the capacitance of varactor diodes D1 and D2 cancels the decrease in the capacitance of varactor diodes D3 and D4, variations in the voltage of the phase-corrected in-phase LO signal I LO PC can have a reduced effect on the phase shift provided by the RC network. If the voltage-to-capacitance curve for the varactor diodes D1-D4 were linear, the increase in the capacitance of varactor diodes D1 and D2 would cancel the decrease in the capacitance of varactor diodes D3 and D4. For practical varactor diodes, the voltage-capacitance curve is nonlinear and the increase in the capacitance of varactor diodes D1 and D2 does not exactly cancel the decrease in the capacitance of varactor diodes D3 and D4.

Similarly, as the voltage of the phase-corrected quadrature LO signal Q LO PC decreases, the magnitude of the reverse bias voltage across varactor diode D5 and can decrease and a magnitude of a reverse bias voltage across varactor diode D6 can increase. This change in the voltage of the phase-corrected quadrature LO signal Q LO PC can increase the capacitance of varactor diode D5 while decreasing the capacitance of varactor diode D6. To the extent that the increase in the capacitance of varactor diode D5 cancels the decrease in the capacitance of varactor diode D6, variations in the voltage of the phase-corrected quadrature LO signal Q LO PC can have a reduced effect on the phase shift provided by the CR network. If the voltage-to-capacitance curve for the varactor diodes D5 and D6 were linear, the increase in the capacitance of varactor diode D5 would cancel the decrease in the capacitance of varactor diode D6. For practical varactor diodes, the voltage-capacitance curve is nonlinear and the increase in the capacitance of varactor diode D5 does not exactly cancel the decrease in the capacitance of varactor diode D6.

In these and other embodiments of the present invention, amplifier A1 and amplifier A2 can be implemented using a single fully differential amplifier.

While embodiments of the present invention are well-suited for utilization in quadrature modulators, such as quadrature amplitude modulators, quadrature phase-shift keying modulators, or other modulators, embodiments can also be employed to the benefit of other circuits, such as demodulators, signal analyzers, and others.

These and other embodiments of the present invention can employ one or more types of mixers. For example, some or all of the mixers can be double-balanced mixer, single-balanced mixers, ring-diode mixers, Gilbert multipliers, or other types of mixers. The power-detectors can be formed of a series diode with a capacitor to ground, they can be area integrators, or they can be other types of circuits. The quadrature hybrid can be replaced with R-C and C-R networks in the in-phase and quadrature paths. A quadrature modulator can be formed on a single integrated circuit, or it can be implemented as a combination of different circuits.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A quadrature modulator comprising:
   a quadrature hybrid to receive a local oscillator (LO) signal and to provide an in-phase LO signal and a quadrature LO signal;
   a phase-correction circuit coupled to receive the in-phase LO signal, the quadrature LO signal, and a phase-correction signal and to provide a phase-corrected in-phase LO signal and a phase-corrected quadrature LO signal;
   a first amplitude-correction circuit to receive the phase-corrected in-phase LO signal, to adjust an amplitude of the phase-corrected in-phase LO signal, and to provide an amplitude-and-phase-corrected in-phase LO signal;
   a second amplitude-correction circuit to receive the phase-corrected quadrature LO signal, to adjust an amplitude of the phase-corrected quadrature LO signal, and to provide an amplitude-and-phase-corrected quadrature LO signal;
   a phase-detect circuit to modulate the amplitude-and-phase-corrected in-phase LO signal with the amplitude-and-phase-corrected quadrature LO signal and to provide the phase-correction signal to the phase-correction circuit; and
   a modulator to modulate an in-phase baseband signal with the amplitude-and-phase-corrected in-phase LO signal, to modulate a quadrature baseband signal with the amplitude-and-phase-corrected quadrature LO signal, and to sum the resulting products.

2. The quadrature modulator of claim 1 wherein the phase-detect circuit comprises a ring mixer.

3. The quadrature modulator of claim 1 wherein the phase-detect circuit comprises a first mixer to modulate the amplitude-and-phase-corrected in-phase LO signal with the amplitude-and-phase-corrected quadrature LO signal, a second mixer to modulate the amplitude-and-phase-corrected quadrature LO signal with the amplitude-and-phase-corrected in-phase LO signal, and an adder to add the resulting products.

4. The quadrature modulator of claim 1 wherein the phase-detect circuit comprises a single-balanced mixer, where the single-balanced mixer comprises a first zero-bias Schottky diode.

5. The quadrature modulator of claim 1 wherein the phase-correction circuit comprises:
   a first mixer to modulate the quadrature LO signal with the phase-correction signal;
   a first summing circuit to add the in-phase LO signal with an attenuated product from the first mixer to generate the phase-corrected in-phase LO signal;
   a second mixer to modulate the in-phase LO signal with the phase-correction signal; and
   a second summing circuit to add the quadrature LO signal with an attenuated product from the second mixer to generate the phase-corrected quadrature LO signal.

6. The quadrature modulator of claim 1 wherein the phase-correction circuit comprises a diode-ring mixer coupled to receive the phase-correction signal from the phase-detect circuit.

7. The quadrature modulator of claim 1 wherein the phase-correction circuit comprises a single-balanced mixer, where the single-balanced mixer comprises a first PIN diode.

8. The quadrature modulator of claim 7 wherein the phase-correction circuit further comprises:
   a first power splitter coupled to receive the in-phase LO signal, coupled to the single-balanced mixer, and coupled to provide the phase-corrected in-phase LO signal to the first amplitude-correction circuit; and
   a second power splitter coupled to receive the quadrature LO signal, coupled to the single-balanced mixer, and coupled to provide the phase-corrected quadrature LO signal to the first amplitude-correction circuit.

9. The quadrature modulator of claim 1 wherein the first amplitude-correction circuit and the second amplitude-correction circuit each comprise:
   a variable-gain amplifier;
   a power detector having an input coupled to an output of the variable-gain amplifier; and
   a comparison circuit coupled to compare an output of the power detector to a threshold voltage and to provide a gain control signal to the variable-gain amplifier.

10. The quadrature modulator of claim 9 wherein the power detector comprises a Schottky diode having an anode coupled to an output of the variable-gain amplifier and a cathode coupled to a capacitor, and wherein the comparison circuit is an amplifier.

11. A quadrature modulator comprising:
   a phase-split and correction circuit coupled to receive a local oscillator (LO) signal and a phase-correction signal, and to provide a phase-corrected in-phase LO signal and a phase-corrected quadrature LO signal;
   a first amplitude-correction circuit to receive the phase-corrected in-phase LO signal, to adjust an amplitude of the phase-corrected in-phase LO signal, and to provide an amplitude-and-phase-corrected in-phase LO signal;
   a second amplitude-correction circuit to receive the phase-corrected quadrature LO signal, to adjust an amplitude of the phase-corrected quadrature LO signal, and to provide an amplitude-and-phase-corrected quadrature LO signal;
   a phase-detect circuit to modulate the amplitude-and-phase-corrected in-phase LO signal with the amplitudeand-phase-corrected quadrature LO signal and to provide the phase-correction signal to the phase-split and correction circuit; and a modulator to modulate an in-phase baseband signal with the amplitude-and-phase-corrected in-phase LO signal, to modulate a quadrature baseband signal with the amplitude-and-phase-corrected quadrature LO signal, and to sum the resulting products.

12. The quadrature modulator of claim 11 wherein the phase-split and correction circuit comprises:

an RC network to receive the LO signal and provide the phase-corrected in-phase LO signal; and a CR network to receive the LO signal and provide the phase-corrected quadrature LO signal.

13. The quadrature modulator of claim 12 wherein the RC network comprises a resistance coupled between a source of the LO signal and the first amplitude-correction circuit, and a first capacitance coupled between the resistance and ground, and wherein the CR network comprises a source impedance for the source of the LO signal and a second capacitance, the second capacitance coupled between the source of the LO signal and the second amplitude-correction circuit.

14. The quadrature modulator of claim 13 wherein the first capacitance comprises a first capacitor coupled to an anode of a first varactor, wherein the anode of the first varactor is further coupled to receive a first tuning voltage, and wherein the second capacitance comprises a second capacitor coupled to an anode of a second varactor, wherein the anode of the second varactor is further coupled to receive a second tuning voltage.

15. The quadrature modulator of claim 14 wherein the first capacitance further comprises a third capacitor coupled to a cathode of a third varactor, wherein the cathode of the third varactor is further coupled to receive a third tuning voltage, the third tuning voltage the inverse of the first tuning voltage, and wherein the second capacitance further comprises a fourth capacitor coupled to a cathode of a fourth varactor, wherein the cathode of the fourth varactor is further coupled to receive a fourth tuning voltage, the fourth tuning voltage the inverse of the second tuning voltage.

16. The quadrature modulator of claim 15 wherein the phase-detect circuit comprises a single-balanced mixer, where the single-balanced mixer comprises a first zero-bias Schottky diode and a second zero-bias Schottky diode.

17. The quadrature modulator of claim 16 wherein the phase-detect circuit further comprises:

a first power splitter coupled to receive the amplitude-and-phase-corrected in-phase LO signal, coupled to the single-balanced mixer, and coupled to provide the amplitude-and-phase-corrected in-phase LO signal to the modulator; and a second power splitter coupled to receive the amplitude-and-phase-corrected quadrature LO signal, coupled to the single-balanced mixer, and coupled to provide the amplitude-and-phase-corrected quadrature LO signal to the modulator.

18. The quadrature modulator of claim 17 wherein the first amplitude-correction circuit and the second amplitude-correction circuit each comprise:

a variable-gain amplifier;

a power detector having an input coupled to an output of the variable-gain amplifier; and a comparison circuit coupled to compare an output of the power detector to a threshold voltage and to provide a gain control signal to the variable-gain amplifier.

19. The quadrature modulator of claim 18 wherein the power detector comprises a Schottky diode having an anode coupled to an output of the variable-gain amplifier and a cathode coupled to a capacitor, and wherein the comparison circuit is an amplifier.

* * * * *